(12) United States Patent  
Pallapothu et al.

(10) Patent No.: US 8,886,995 B1  
(45) Date of Patent: Nov. 11, 2014

(54) FAULT TOLERANT STATE MACHINE FOR CONFIGURING SOFTWARE IN A DIGITAL COMPUTER

(75) Inventors: Sateesh Pallapothu, Cary, NC (US); Hwai-Yeng Chan, Cary, NC (US); Ping He, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 335 days.

(21) Appl. No.: 13/249,170

(22) Filed: Sep. 29, 2011

(51) Int. Cl.  
*G06F 11/00* (2006.01)  
*G06F 11/14* (2006.01)  
*G06F 11/36* (2006.01)

(52) U.S. Cl.  
CPC ........ *G06F 11/1471* (2013.01); *G06F 11/3636* (2013.01)  
USPC .......................................................... 714/15

(58) Field of Classification Search  
CPC ............ G06F 11/1471; G06F 11/1469; G06F 11/3636  
USPC .......................................................... 714/15  
See application file for complete search history.

(56) References Cited

U.S. PATENT DOCUMENTS

| | | | |
|---|---|---|---|
| 5,758,149 A | 5/1998 | Bierma et al. | |
| 5,828,876 A | 10/1998 | Fish et al. | |
| 5,987,621 A | 11/1999 | Duso et al. | |
| 6,643,722 B1 | 11/2003 | Scaringella et al. | |
| 6,745,286 B2 | 6/2004 | Staub et al. | |
| 7,051,050 B2 | 5/2006 | Chen et al. | |
| 7,219,260 B1 | 5/2007 | de Forest et al. | |
| 7,373,364 B1 | 5/2008 | Chapman | |
| 7,555,569 B1 | 6/2009 | O'Hare | |
| 7,609,651 B1 | 10/2009 | McBride et al. | |
| 7,716,684 B2 | 5/2010 | Singhal et al. | |
| 7,971,091 B1 | 6/2011 | Bingham et al. | |
| 7,984,131 B1 | 7/2011 | Gandhi et al. | |
| 8,095,764 B1 | 1/2012 | Bauer et al. | |
| 2002/0002661 A1 | 1/2002 | Blumenau et al. | |
| 2005/0278701 A1* | 12/2005 | Buskens et al. | 717/120 |
| 2006/0212671 A1* | 9/2006 | Todd | 711/165 |
| 2010/0281239 A1* | 11/2010 | Sudhakar et al. | 712/222 |

OTHER PUBLICATIONS

EMC Storage Configuration Advisor, Data Sheet, Jan. 2011, 3 pages, EMC Corporation, Hopkinton, MA.

(Continued)

*Primary Examiner* — Yair Leibovich  
(74) *Attorney, Agent, or Firm* — Richard Auchterlonie; Novak Druce Connolly Bove + Quigg LLP

(57) ABSTRACT

Software configuration changes are made in a digital computer by executing selected opcodes to add new features. When executing each opcode, a persistent record is kept of execution of each elementary command of the opcode. To recover from a failure of execution of an opcode, remediation opcodes are executed for a known error, or else the persistent record of execution is accessed to identify executed commands of the opcode, and the executed commands are reverted in reverse order by undoing changes made to the software configuration by the executed commands of the opcode. The resulting configuration of the digital computer is compared to a backup copy of the configuration existing at the start of execution of the opcode. If the reversion of the executed commands of the opcode has not reproduced the backup configuration, then the configuration of the digital computer is restored to the backup configuration.

8 Claims, 16 Drawing Sheets

(56) References Cited

OTHER PUBLICATIONS

Vahalia, Uresh, et al., Metadata Logging in an NFS Server, USENIX 1995, Jan. 16-20, 1995, New Orleans, Louisiana, 12 pages, the USENIX Association, Berkeley, CA.

Burkes, D.L., and Treiber, R.K., "Design Approaches for Real-Time Transaction Processing Remote Site Recovery," Computer Society International Conference (COMPCON), Spring Meeting, Los Alamitos, Feb. 26-Mar. 2, 1990, No., Conf. 35, Feb. 23, 1990, Institute of Electrical and Electronics Engineers, New York, N.Y., pp. 568-572.

Batsakis, Alexandros, and Burns, Randal, "NFSv4 as the Building Block for Fault Tolerant Applications," Johns Hopkins University, NEPS Workshop at the University of Michigan, Ann Arbor, MI, Dec. 4, 2003, position paper (4 pages) and presentation (16 pages).

Shastry, Mallikarjuna, et. al., Selection of a Checkpoint Interval in Coordinated Checkpointing Protocol for Fault Tolerant Open MPI, (IJCSE) International Journal on Computer Science and Engineering, vol. 02, No. 06, 2010, pp. 2064-2070, Keja Publications, Vandalur, Chennai, India.

Lissot, Anthony, Linux Partition HOWTO, Apr. 13, 2009, 30 pages, linux.com, Linux Foundation, San Francisco, CA.

Self, Karsten M., Linux Partitioning mini-FAQ, Dec. 28, 2010, 11 pages, linuxmafia.com, Menlo Park, CA.

Red Hat Deployment Guide Sec. 10.4 to 10.5.3, Jun. 11, 2011, 15 pages, Red Hat Inc., Raleigh, NC.

EMC Plug-Ins for VMware vCenter, Aug. 10, 2010, 5 pages, EMC Corporation, Hopkinton, MA.

\* cited by examiner

| OPCODE | ERROR CODE | ERROR INFORMATION FILE RESOLUTION FILE | RESUME AFTER RESOLUTION |
|---|---|---|---|
| OP1 | ERR001 | /CO/REESTAB/MOV_0010.TXT | YES |
| OP1 | ERR002 | /CO/REESTAB/MOV_0011.TXT | NO |
| ⋮ | ⋮ | ⋮ | ⋮ |
| OP2 | ERR0010 | /CO/REESTAB/CIV_0010.TXT | YES |
| OP2 | ERR0011 | /CO/REESTAB/CIV_0011.TXT | YES |
| ⋮ | ⋮ | ⋮ | ⋮ |

| STATE FILE FIELD | BRIEF DESCRIPTION |
|---|---|
| INDEX | INDEX OF THE LAST SUCCESSFUL COMMAND IN THE COMMAND ARRAY |
| TO_LVMTABLE _CHECKSUM | CHECKSUM OF TARGET "LVM TABLE FILE" WHICH IS SHIPPED WITH NEW UPDATE |
| TO_LVMTABLE | PATHNAME OF THE TARGET "LVM TABLE FILE" |
| FROM_LVMTABLE _CHECKSUM | CHECKSUM OF PRESENT "LVM TABLE FILE" WHICH IS ALREADY EXISTING PRIOR TO STARTING THIS LVM DEPLOYMENT OPERATION |
| FROM_LVMTABLE | PATHNAME OF ALREADY EXISTING "LVM TABLE FILE" |
| DEVICE_MAP_DIR | PATHNAME OF DIRECTORY WHERE PRODUCT-SPECIFIC DEVICE MAP IS LOCATED |
| STORAGE COMMAND_FILE _CHECKSUM | THE CHECKSUM OF THE STORAGE COMMAND FILE WHICH IS USED FOR THIS LVM DEPLOYMENT OPERATION |
| STORAGE COMMAND_FILE | PATHNAME OF THE STORAGE COMMAND FILE WHICH IS USED FOR THIS LVM DEPLOYMENT OPERATION |
| MODE | CONFIGURATION OPERATION WHERE THIS LVM DEPLOYMENT IS HAPPENING AS PART OF |
| PLATFORM | PRODUCT-SPECIFIC FIELDS |
| ⋮ | |

FIG. 20

FAULT TOLERANT STATE MACHINE FOR CONFIGURING SOFTWARE IN A DIGITAL COMPUTER

LIMITED COPYRIGHT WAIVER

A portion of the disclosure of this patent document contains computer code listings and command formats to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

FIELD OF THE INVENTION

The present invention relates generally to software for a digital computer having a variety of possible features. More particularly, the invention relates to avoiding faults during a software configuration change to add new features so that all of the new features are supported by presently available hardware and software components.

BACKGROUND OF THE INVENTION

There have been continual advances in hardware components for digital computers, such as processors, memory, storage, and network interfaces. An increasing amount of processing power, memory capacity, storage capacity, and network data transmission bandwidth is available at decreasing cost. Complex computer systems for a variety of applications are being constructed from rather inexpensive commodity hardware components. The development and maintenance of application software, however, have become an increasing burden. Moreover, operating systems have become more complex. Some operating systems require frequent updates as software bugs and vulnerabilities become exposed during normal use.

The addition of hardware components to a computer system typically requires a software change to the operating system or firmware, and the system must be shut down and restarted for these changes to become effective. System users are tolerant of these minor service disruptions because the system capabilities are enhanced.

Occasionally a software installation or update will be unsuccessful. In a typical good case of an unsuccessful software installation or update, an error message will result before the system is shut down for re-boot, and an administrator will have the option of diagnosing the error and attempting to continue the installation or update process after a change in the desired system configuration. In a typical bad case of an unsuccessful software installation or update, an error message results after system shut-down and re-boot, and an administrator has the option of diagnosing the error while users are denied service, or else attempting to restore the system configuration to the state existing at the start of the installation or update process. An unsuccessful attempt to update an operating system is especially annoying because there is continued exposure to the software bugs and vulnerabilities that need correcting.

More recently, it has been possible for certain kinds of software configuration changes to be made without a need for shutting down and restarting the computer system.

SUMMARY OF THE INVENTION

In accordance with one aspect, the invention provides a method of configuring software in a digital computer. The method includes a data processor of the digital computer executing computer instructions stored on a non-transitory computer readable storage medium to perform the steps of: (a) accessing opcodes in a software configuration program, each opcode enabling transition of a software configuration in the digital computer from a present state of the software configuration to another state of the software configuration having a new version of a feature, and each opcode having one or more commands; (b) executing the opcodes to add multiple features to the software configuration, and when executing each opcode, keeping a persistent record of execution of each command of each opcode; and (c) in response to a failure of execution of a command in one of the opcodes, recovering from the failure by accessing the persistent record of execution to identify executed commands of the one of the opcodes, and by undoing changes made to the software configuration by the execution of the executed commands of the one of the opcodes.

In accordance with another aspect, the invention provides a computer program product including non-transitory computer readable storage medium storing computer instructions and data structures. The computer instructions and data structures include software information representing a version of software to be configured in a digital computer, a plurality of opcodes, and a state machine program. Each opcode, when executed by a data processor of the digital computer, performs a transition from a present state of a software configuration to another state of the software configuration having a new version of a feature. The state machine program, when executed by the data processor, accesses the software information to select one or more of the opcodes, and executes commands of the selected opcodes to add new versions of features of the software configuration, and keeps a persistent record of execution of each command of each selected opcode. In response to a failure of execution of a command of one of the selected opcodes, the state machine program recovers from the failure by accessing the persistent record of execution to identify executed commands of the one of the selected opcodes, and by undoing changes made to the software configuration by the execution of the executed commands of the one of the selected opcodes.

In accordance with a final aspect, the invention provides a method of configuring software in a digital computer of a data storage system where multiple versions of the software are available. The method includes loading a software configuration program into the data storage system, the software configuration program including computer instructions and data structures. The computer instructions and data structures include software information representing a version of software to be configured in the digital computer, a plurality of opcodes, and a state machine program. Each opcode, when executed by a data processor of the digital computer, performs a transition from a present state of a software configuration in the digital computer to another state of the software configuration having a new version of a feature. The method further includes executing the state machine program with the data processor of the digital computer to perform the steps of: (1) accessing the software information to select one or more of the opcodes; (2) executing the selected opcodes to add multiple features to the software configuration, and when executing each selected opcode, keeping a persistent record of execution of commands of each selected opcode; and (3) in response to a failure of execution of a command in one of the selected opcodes, recovering from the failure by accessing the persistent record of execution to identify executed commands of the one of the selected opcodes, and undoing changes made to the software configuration by the execution of the executed commands of the one of the selected opcodes. Moreover, the changes made to the software configuration partition storage of the storage system into logical volumes for storage management.

BRIEF DESCRIPTION OF THE DRAWINGS

Additional features and advantages of the invention will be described below with reference to the drawings, in which:

FIG. 20 is a table describing fields of a state file for configuration of the LVM software;

Figure 1:
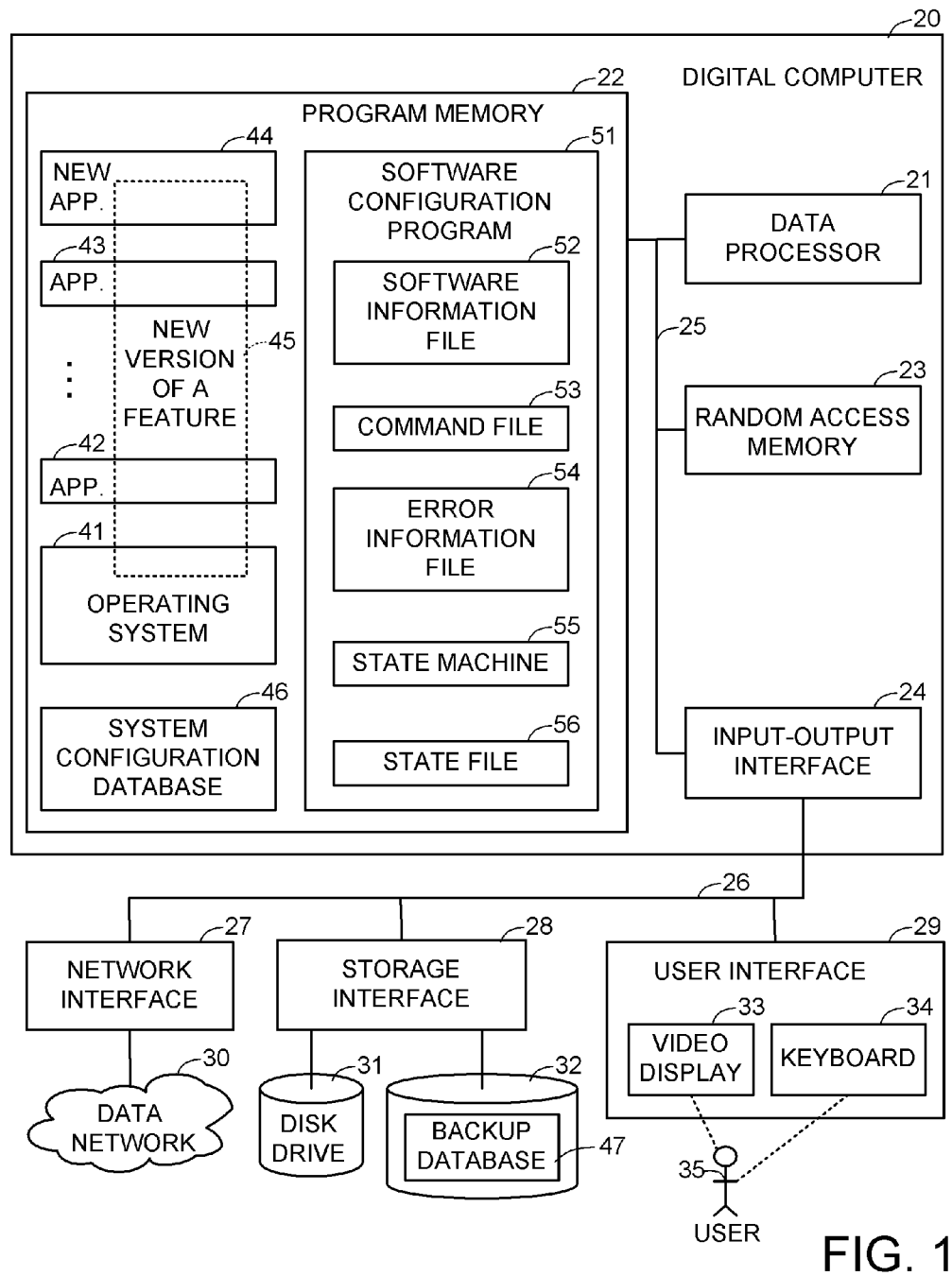
FIG. 1 is a block diagram of a general purpose digital computer programmed with a software configuration program in accordance with an aspect of the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a general-purpose digital computer 20 including a data processor 21, program memory 22, random-access memory 23, and an input/output interface 24. The data processor 21 includes one or more core central processing units (CPUs) for executing computer program instructions stored in the program memory 22. The general-purpose digital computer 20 is a commodity item typically built on a single motherboard or server blade.

The program memory 22 is a non-transitory computer readable storage medium, such as electrically erasable and programmable read-only memory (EEPROM). In general, non-transitory computer readable storage medium is a physical device or physical material which serves to store computer-readable data on a permanent or semi-permanent basis. Examples of other kinds of non-transitory computer readable storage medium include magnetic disks, magnetic tape, and optical disks.

The input-output interface 24 connects a data processor bus 25 to an input-output bus 26. The input-output bus 26 connects a network interface 27, a storage interface 28, and a user interface 29 to the input/output interface 24. The network interface 27 provides input and output of data from a data network 30, such as a local area network (LAN) or the Internet. The storage interface 38 provides input and output of data from disk drives 31, 32. The user interface 29 provides input and output of data through a video display 33 and a keyboard 34 operated by a human user 35.

The input-output bus 26 may interconnect various other kinds of peripherals to the input-output interface 24 for special-purpose applications. For example, the other kinds of peripherals may include printers, scanners, wireless interfaces, telephone modems, archival storage devices, sensors, actuators, and additional general-purpose digital computers or special-purpose processors such as floating-point processors or graphics accelerators. Thus, the computer system in FIG. 1 may be integrated or distributed, and may be scaled to a large size by incorporating additional layers of channel and network connections.

The invention more particularly concerns an improved mechanism for configuring the software in the program memory 22 of the digital computer 20. In general, this software is initially configured during installation of the software, and later changes are made to this initial configuration in order to correct problems with the initial configuration, or to add programs or peripherals for performing additional functions, or to update or upgrade the software. The software may configure the digital computer 20 to function as a special-purpose computer. For example, the digital computer 20 may be configured to function as a workstation, a network router, or a network server.

The invention has been developed in order to facilitate the installation and the update or upgrade of software where multiple versions of the software are available, and wherein each version of the software may or may not have a version of a feature. Accordingly, information is stored representing the version of software that is being installed or updated or upgraded, and this version of software has a new version of a feature. The new version of the feature can be a feature that the digital computer did not have prior to the installation or update or upgrade, or the new version of the feature can be an updated version of a feature that the original digital computer had prior to the installation or update or upgrade. The software can be any software application or operating system (OS) in any type of digital computer system including but not limited to servers, networking systems and storage systems. The feature may be any feature of the software including but not limited to memory management, storage management, network management, application features and/or management, and the like.

In a preferred implementation of the invention, opcodes are provided, and each opcode enables the transition from a present state of the software configuration to another state of software configuration having a new version of a feature. A state machine is executed that consults the stored information to access one or more of the opcodes. The opcodes are executed to transition from the present state of the software configuration eventually to the state of the software configuration having the new version of the feature. Thus it may be that several opcodes are executed, and each opcode transitions from one version of the feature to another, until the transition is complete from the present state of the software configuration to the state of software configuration having the new version of the feature.

In the preferred implementation of the invention, a checkpoint operation is performed before each opcode is executed to add a new version of a feature. The checkpoint operation saves the system configuration at the beginning of execution of the opcode. If an error occurs during the execution of an opcode, then a recovery operation is performed, and if the recovery operation is unsuccessful, then the system configuration is restored from the checkpoint version that was saved at the beginning of execution of the opcode.

For example, during execution of each opcode, a transaction log records the execution of every command of the opcode. If an error occurs during the execution of an opcode, then recovery information is accessed to determine if the recovery information includes any remediation opcodes associated with the error. If the recovery information is found to include remediation opcodes associated with the error, then the remediation opcodes are executed. If the recovery information is not found to include any remediation opcodes associated with the error, then the transaction log is accessed to determine if one or more commands of the opcode were executed. If commands of the opcode were executed, then the commands are reverted in reverse order, and the resulting configuration is compared to the checkpoint version that was stored at the beginning of execution of the opcode in order to determine if the reversion of the commands is successful in recovering from the error.

In this way, opcodes are executed as needed to automatically update or upgrade software that either lacks a feature or has an old version of a feature in order to provide a new version of the feature. Error protection and recovery reinstatement are further provided.

FIG. 1 shows software in the program memory 22 for performing this method of software configuration and recovery from an error during the configuration process. The software initially includes an operating system 41 and a stack of application programs 42, 43, layered over the operating system. A new application 44 is added to add a new version of a feature 45. The operating system 41 and the application programs 42, 43, and 44 support the new version of the feature 45. In general, a new version of a feature may reside within one or more applications, or within the operating system 41, or across a stack including the operating system and layers of applications. Adding a new version of a feature may involve loading one or more applications into the program memory 22 and invoking the operating system 41 to register the applications and the feature in a system configuration database 46.

It is often necessary to update or upgrade digital computer systems in the field to incorporate a new version of a feature. The software configuration update or software application upgrade may be needed for systems that reside in customer use or systems that are ready to ship to customers. Often it is necessary to update or upgrade a present software package including the operating system 41 and/or applications 42, 43, 44 to implement a newly available version of the feature 45. Eventually, after much updating or upgrading of multiple platforms of systems, and multiple versions of the software containing the feature 45, there are lots of different versions of the feature 45 present in the field.

Examples of the operating system 41 include Linux, UNIX, and/or Microsoft Windows. Examples of applications 42, 43, 44 include networking, storage, or user applications that run on these operating systems. Examples of features include memory cache sizing, partitioning, or other configuration utilities, static or dynamic storage partitioning or other configuration utilities, or network configuration utilities for use by the operating system 41 or an application.

Previously, when features of software were in need of an update or upgrade, an update or upgrade package would be provided that would update or upgrade the software from the present version directly to the new version. But it is ineffective to provide separate update or upgrade software for every permutation of feature update or upgrade possibilities when so many different present versions of the software containing the feature may exist in the field.

In the system of FIG. 1, the program memory 22 includes a software configuration program 51 for configuring software of the digital computer 20. The software of the digital computer is initially configured during installation of the software, and reconfigured during software updates or upgrades, or to add or remove selected features of the software. The software updates or upgrades and the reconfiguration to add or remove selected features of the software may occur automatically during normal operation of the digital computer.

The software configuration program 51 is deployed by the user 35 at the user interface 29, or by any other deployment method. The software configuration program 51 loads into the program memory 22. The software configuration program 51 deploys a software information file 52 and a command file 53, and may include an error information file 54.

The software information file 52 includes information representing the version of software that is being configured—including information about features associated with new software being configured. The command file 53 includes opcodes. Each of these opcodes enables a failsafe transition from one present state of the software configuration to another state of the software configuration. A state machine 55 consults the information file 52 and the command file 53 in order to access one or more groups of the commands in the command file 53 to transition from the present state of the software configuration, that may not have any version of the feature 45, or may have an old version of the feature 45, to the state of the software configuration that has the new version of the feature 45. If an error is encountered during this process, the error information file 54 may be accessed in an attempt to recover and continue the operation. Otherwise, the state machine will recover from the failed operation by restoring the system state from the previous checkpoint.

The state machine 55 employs a state file 56 in order to keep persistent state during an installation, update, upgrade, or recovery operation. The state information in the state file 56 persists upon planned or unplanned system shut-down and reboot. For example, if the configuration process is interrupted by a system disruption, the state machine 55 accesses the state file 56 upon rebooting of the system (planned or unplanned) in order to continue remaining configuration operations.

Figure 2:
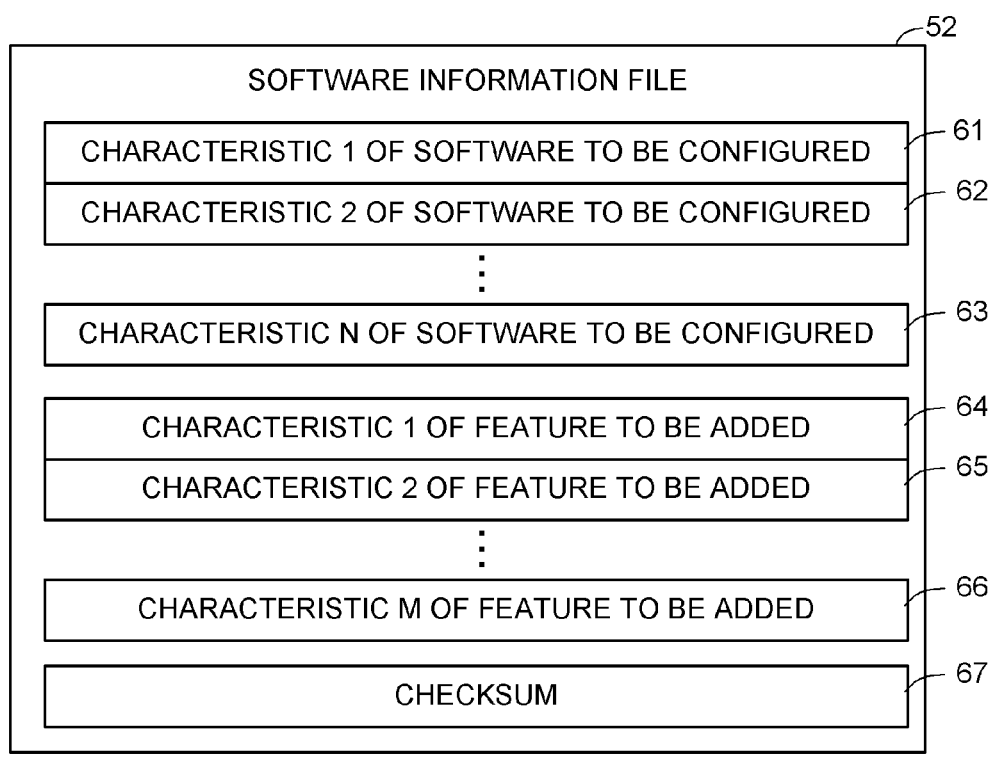
FIG. 2 is a block diagram of a software information file of the software configuration program introduced in FIG. 1.

FIG. 2 shows an example of a software information file 52. The software information file 52 is embodied in the form of a table. The table lists a number of characteristics 61, 62, 63 of the new version of the software. The table also lists a number of characteristics 64, 65, 66 of the new feature to be added. A checksum 67 is used by the state machine to verify the integrity of the software information file 52.

Figure 3:
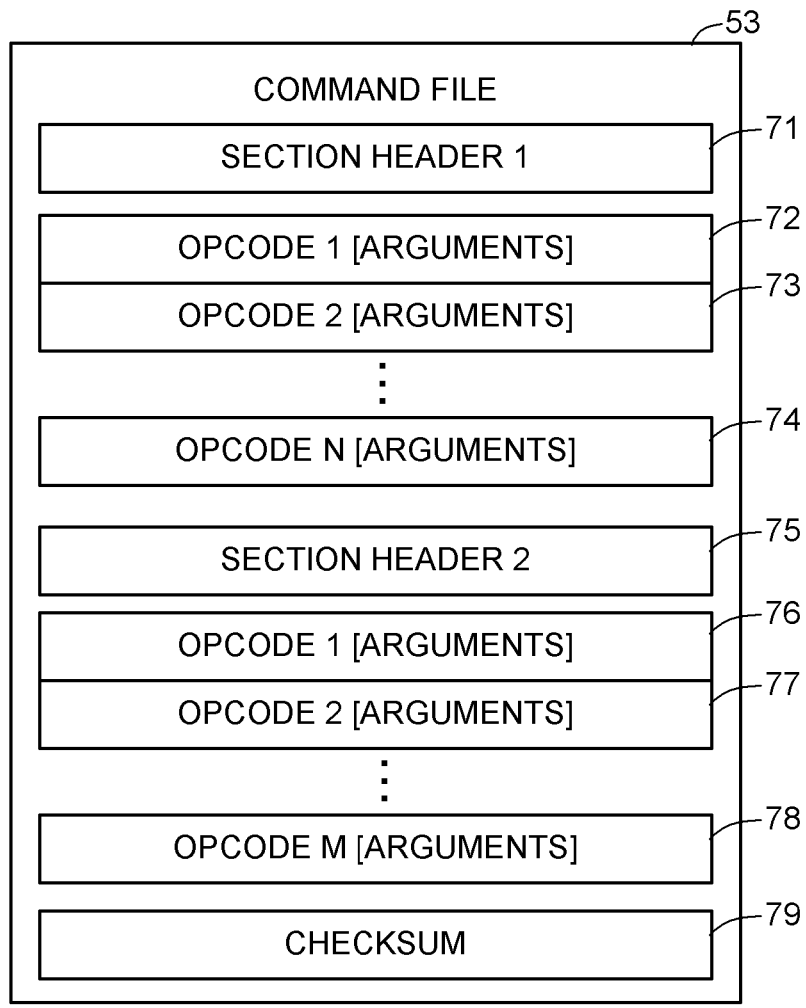
FIG. 3 is a block diagram of a command file of the software configuration program.

FIG. 3 shows an example of a command file 53. The command file 53 is divided into sections separated by section headers 71, 75. Each section contains a list of opcodes although a section may contain only one opcode. For example, a first section includes the first section header 71 and a list of opcodes 72, 73, and 74. A second section includes the second section header 75 and a list of opcodes 76, 77, and 78. A checksum 79 is used by the state machine (55 in FIG. 1) to verify the integrity of the command file 53.

Each section of the command file 53 contains at least one opcode that enables transition from one present state of the software configuration to another state of the software configuration. For example, the first section contains commands 72, 73, 74 that enable transition from a state of the software configuration that does not include any version of a feature to a state of the software configuration that does include the new version of the feature. The second section contains opcodes 76, 77, 78 that enable transition from a state of the software configuration that contains an older version of the feature to a state of the software configuration that contains the new version of the feature. Another section 80 may contain opcodes that enable transition to a state of the software configuration that contains an even newer version of the feature. Multiple sections of the command file 53 can be executed to perform multiple version updates or upgrades of the feature, as will be seen.

In a preferred implementation, the entries in the command file 53 contain pseudo-commands. Each pseudo-command includes an opcode, and the opcode may be followed by an argument list. The opcode of a pseudo-command is independent of, and translatable to, underlying computing code. For instance, an opcode may translate to a set of Linux code that relates to moving data. Another opcode may translate to a set of Linux code that relates to sizing an area of storage. Or, an opcode may translate to commands for a different operating system, or to programming code of a different programming language, instead. That is, the opcode is independent of, and translatable to, underlying computing code at several different layers. The generic nature of the opcodes in the command file 44 offers flexibility and broad application of the invention. Opcodes can be chosen and implemented in accordance with business needs.

Figures 4, 5:
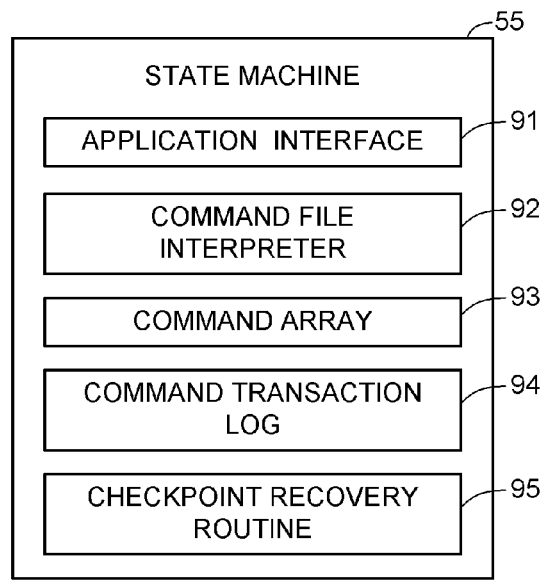
FIG. 4 is a block diagram of an error information file of the software configuration program.
FIG. 5 is a block diagram of a state machine of the software configuration program.

FIG. 4 shows an embodiment of the error information file 54 that takes the form of a table. This table may be loaded along with the software configuration program 51, or it may be loaded later, for instance when an error occurs. The format of the error information file 54 is similar to the format of the command file (53 in FIG. 1) as described previously. For example, the error information file 54 consists of remediation opcodes 81 and corresponding specific error codes 82. The location of a resolution file 83 is listed for each error code 82.

Each resolution file 83 consists of remediation opcodes or more elementary instructions that are specific to resolving a given unique error code 82. A resolution file 83 may provide new opcodes or elementary instructions which can be "loaded in" and are not part of the original resident codes in the command file. "Resume after resolution" 84 is a choice to indicate to the state machine (55 in FIG. 1) to retry the original opcode 81 upon executing the instructions as noted in the resolution file 83. These fields of the error information file 54 are used by the state machine (55 in FIG. 1) as further described below.

FIG. 5 shows components of the state machine 55. The state machine 55 includes an application interface 91, a command file interpreter 92, a command array 93, a command transaction log 94, and a checkpoint recovery routine 95. The application interface 91 provides access to state machine methods such as the command file interpreter 92 for interpreting the pseudo-commands, the checkpoint recovery routine 95, and other methods for generating and accessing the command array 93 and accessing the command transaction log 94, as further described below.

Figure 6:
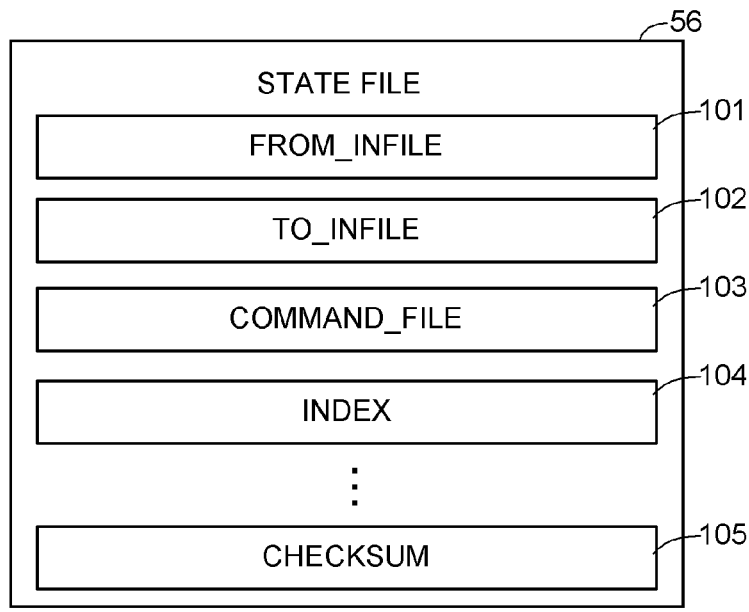
FIG. 6 is a block diagram of a state file of the software configuration program.

FIG. 6 shows an example of the state file 56. The state file 56 has a number of fields of information for keepings track of the execution of commands in the command file (53 in FIG. 1). A pointer to a software information file that describes the original version of the software configuration is stored in a "from_infile" field 101. A pointer to the software information file 52 that describes the desired new state of software configuration is stored in a "to infile" field 102. A pointer to the command file (53 in FIG. 1) is stored in a "command file" field 103. An "index" field 104 indexes the last successful opcode in the command array (93 in FIG. 5), as will be further described. A checksum field 105 includes a checksum to verify the contents of the state file 56.

Figure 7:
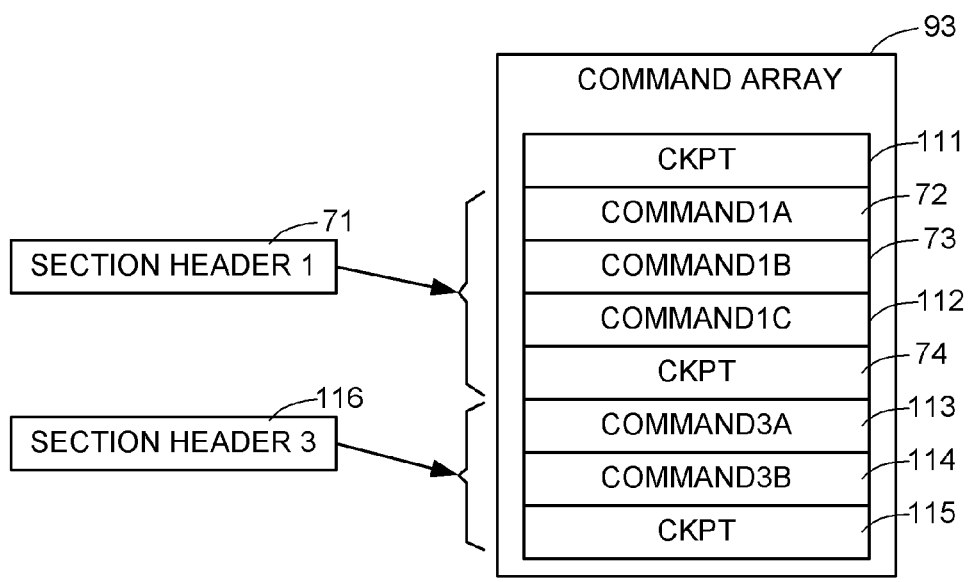
FIG. 7 is a block diagram of a command array of the state machine.

FIG. 7 shows an example of the command array 93. During the configuration process, the state machine (55 in FIG. 1) accesses information in the software information file (52 in FIG. 1), the command file (53 in FIG. 1), and the state file (56 in FIG. 1) to determine the applicable opcodes within the command file (53 in FIG. 1) that must be run to add the new versions of the features. The state machine (55 in FIG. 1) forms the command array 93 containing all the applicable commands to be executed for the configuration process. The state machine (55 in FIG. 1) then runs through these commands from the command array 93 sequentially. As the state machine (55 in FIG. 1) runs through the list of commands in the command array 83 and executes each command, it updates the Index field (104 in FIG. 6) in the state file (56 in FIG. 6) upon successfully completing that command. More particularly, the state of the present software configuration (pointed to by the "from_infile" pointer 101) may be specified by an older version of the software information file (52 in FIG. 1), or it may be information that the state machine 55 gathers during an initial phase of the configuration process.

As further shown in FIG. 7, each opcode in the command array 93 may be associated with header information. For example, the first command in the command array is a checkpoint command 111 having a "CKPT" opcode. The state machine (55 in FIG. 1) automatically inserts this first checkpoint command 111 into the command array 83 to provide a restore point in case there is a failure to add the first new version of a feature to the software configuration. A first series of opcodes 72, 73, 112, 74, from the command file (53 in FIG. 1) is associated with the first section header 71 from the command file. The last command 74 in the first series of opcodes has a "CKPT" opcode to provide a restore point in case there is a failure to add a subsequent feature. A second series of opcodes 113, 114, 115 from the command file (53 in FIG. 1) is associated with a third section header 116 from the command file. The last command 115 from the command file (53 in FIG. 1) has a "CKPT" opcode to provide a restore point in case there is failure to add a subsequent feature.

In general, opcodes in a section of the command file are executed if the section header of the section indicates that the opcodes in the section are associated with a state of the software configuration that has a newer feature than the present state of the software configuration. This header information also serves to filter out or exclude the opcodes that do not apply to the state of software being configured. Thus it may be that, based on examination of the section headers 71, 116, several opcodes are executed, and each opcode transitions from one version of the feature to another, until the transition is complete from the present state of the software configuration to the state of software that is being configured and has the new version of the feature 45.

The checkpoint commands 111, 74, 115 provide a way of automatically restoring the state of the software configuration to a prior consistent state if hardware or software failure or corruptions cause the state machine (55 in FIG. 1) to fail to execute a subsequent command in the command array 93. This avoids a need for manual intervention in many cases to set the system configuration back to a good starting point to run safely a next opcode or retry the failed opcode.

In some cases, setting the software configuration back to a prior consistent state is not sufficient for restoring the system to the best starting point after the failure because there may have been changes to hardware of the digital computer (20 in FIG. 1) or changes to hardware or software of peripherals of the digital computer since the last checkpoint. It is desired to undo any of these changes to the hardware of the digital computer (20 in FIG. 1) or changes to the hardware or software of peripherals of the digital computer since the last checkpoint when restoring the state of the software configuration to a prior consistent state of a checkpoint. For this purpose, the command transaction log (94 in FIG. 5) keeps a record of the changes being made when the state machine (55 in FIG. 1) executes each opcode in the command array 93.

To recover from a failure that interrupted the configuration process, the state machine (55 in FIG. 1) scans the command transaction log (94 in FIG. 5) in reverse order to undo each of the changes that were made to the computer system configuration since the last checkpoint. If the state machine (55 in FIG. 1) is successful in undoing the changes made to the computer system configuration since the last checkpoint, then the present state of the software configuration should be the same as the prior consistent state of the checkpoint. If the state machine (55 in FIG. 1) is not successful in restoring the software configuration to the prior consistent state of the last checkpoint, then the software configuration is restored with the prior consistent state of the last checkpoint under the assumption that a prior consistent state is a better starting point for continuing the configuration process than a possibly inconsistent state. In addition, a comparison of the prior consistent state of the last checkpoint to the software configuration produced by the state machine by attempting to undo the changes recorded in the transaction log may provide some guidance as to how the configuration process should be continued.

Figure 8:
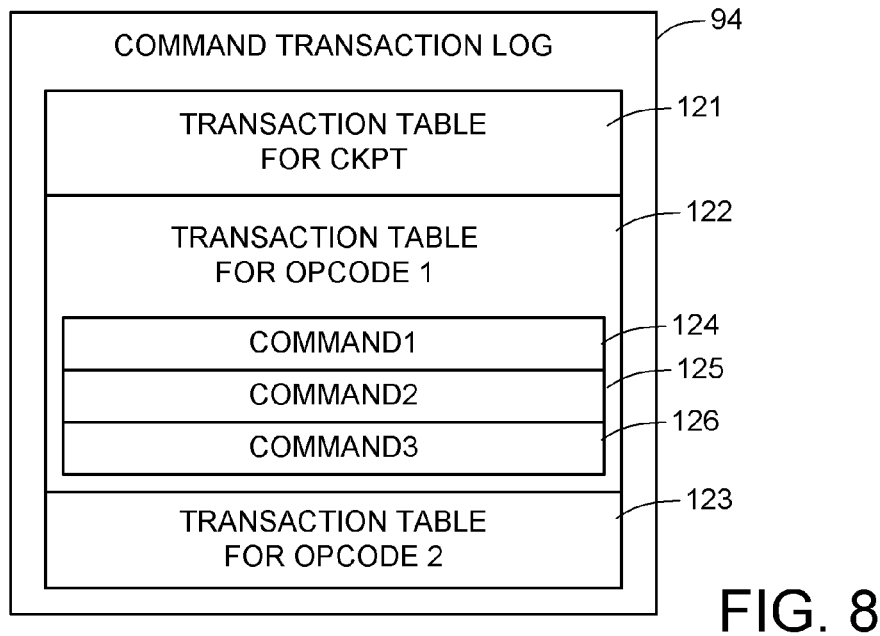
FIG. 8 is a block diagram of a command transaction log of the state machine.

FIG. 8 shows an example of the command transaction log 94. The command transaction log 94 includes a series of transaction tables. When the state machine (55 in FIG. 1) interprets an opcode in the command array (93 in FIG. 5), it begins to write a transaction table for the opcode in the command transaction log 94. For example, the transaction table begins with a header including a copy of the pseudo-command from the command array (93 in FIG. 5), and a pointer back to this pseudo-command in the command array.

In FIG. 8, the first transaction table 121 is for a CKPT opcode. The state machine (55 in FIG. 1) interprets the CKPT opcode by updating the system configuration database (46 in FIG. 1) to reflect the present system configuration, and then storing a copy of the system configuration database into the backup database (47 in FIG. 1).

The state machine (55 in FIG. 1) interprets this next pseudo-command as a series of more elementary computer commands. Before executing each of these elementary computer commands, the state machine writes an entry into the transaction table 122 for the elementary command, and the entry identifies the elementary command. For example, as shown in FIG. 8, the transaction table 122 includes entries 124, 125, and 126, indicating that the state machine interpreted the opcode for the transaction table 122 by executing a series of three more elementary computer commands. The state machine then began writing a transaction table 123 for a following opcode.

When the state machine (55 in FIG. 1) is invoked to use the command transaction log 94 to recover from interruption of the software configuration process, the state machine accesses the end of the command transaction log to find the last opcode and its last incomplete elementary command. If this last opcode is a CKPT opcode and the transaction table for this last opcode includes the name of a backup copy, then this backup copy is validated and then used to restore the system configuration database. Otherwise, the state machine scans the command transaction log 94 in reverse order to undo the configuration changes caused by the execution of the elementary commands following a CKPT opcode.

For example, if the state machine (55 in FIG. 1) were invoked to use the command transaction log 94 in FIG. 8 to recover from interruption of the software configuration process, if the last opcode for the transaction table 123 were not a CKPT opcode, then the state machine would first undo the system configuration changes caused by the third elementary command in the entry 126, and then undo the system configuration changes caused by the second elementary command in the entry 125, and then undo the system configuration changes caused by the first elementary command in the entry 124 in proper reverse order. Then the state machine would get the name of a checkpoint file from the transaction table 121 and read this checkpoint file to verify the checkpoint configuration. If this checkpoint configuration is verified, then this checkpoint configuration is compared to the present system configuration. If this checkpoint configuration is the same as the present system configuration, then the state machine has been successful in restoring the system configuration to the system configuration of the checkpoint. Otherwise, the system configuration database (46 in FIG. 1) is restored with the checkpoint configuration from the checkpoint file in the backup database (47 in FIG. 1).

Figure 9:
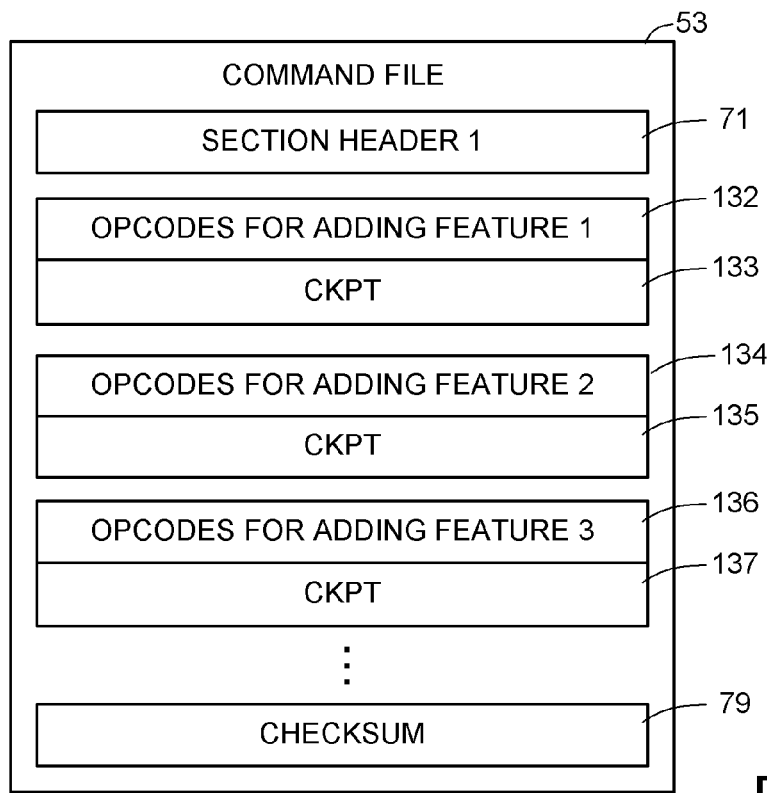
FIG. 9 is a block diagram of a command file of the state machine.

As shown in FIG. 9, in a usual case, a group of opcodes in the command file 53 represent the handling of data for one feature, and a checkpoint opcode (CKPT) is placed after each group. Therefore, upon restoration of the system configuration to the checkpoint configuration, the system configuration includes a particular version of the software changes. For example, in the command file 53, after the first section header 71, there is placed a first group of opcodes 132 for adding a first feature. A first checkpoint opcode 133 is placed after this first group of opcodes 132. After this first checkpoint opcode 133, there is placed a second group of opcodes 134 for adding a second feature. A second checkpoint opcode 135 is placed after this second group of opcodes 134. After this second checkpoint opcode 135, there is placed a third group of opcodes 136 for adding a third feature. A third checkpoint opcode 137 is placed after this third group of opcodes 136.

Figure 10:
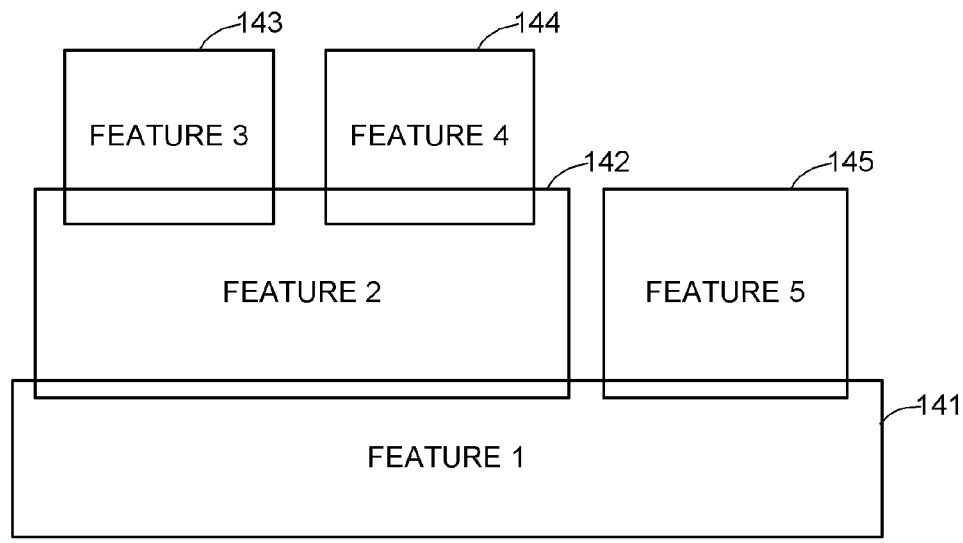
FIG. 10 is a block diagram of dependencies among features.

As shown in FIG. 10, there are often dependencies among the various features. For example, a first feature 141 is the most basic. A second feature 142 is dependent on the first feature 142 so that the second feature may require the presence of the first feature 141. A third feature 143 may require the presence of the second feature 142. A fourth feature 144 may also require the presence of the second feature 142, but otherwise the fourth feature may be independent of the third feature 143. In a similar fashion, a fifth feature 145 may require the presence of the first feature 141 but otherwise is independent of the second feature 142, the third feature 143, and the fourth feature 144.

In this example of FIG. 10, the software information file could include a first group of opcodes for adding the first feature 141, followed by a second group of opcodes for adding the second feature 142, followed by a third group of opcodes for adding the third feature 143, followed by a fourth group of opcodes for adding the fourth feature 144, followed by a fifth group of opcodes for adding the fifth feature 145. The first feature could be a required feature 141 that is always added whenever the software configuration program (51 in FIG. 1) is run, and the other features could be optional.

Depending on a choice of the user and possibly the presence of certain peripherals required for some of the features, the optional features would or would not be added. For example, one permissible system configuration resulting from the configuration process would be a system including only the basic feature 141. Another permissible system configuration would be a system including the basic feature 141 and one or both of the second feature 142 and the fifth feature 145. A permissible system configuration may also include the third feature 143 or the fourth feature 144 if and only if the system configuration also includes the second feature 142.

The dependencies among the features may also dictate whether the configuration process may continue after there is a failure to add a feature and recovery is possible only if the system configuration is restored to the state of a checkpoint before that feature is added. Suppose, for example, that the user (35 in FIG. 1) would like the software configuration program (51 in FIG. 1) to add all five of the features 141, 142, 143, 144, 145, but the software configuration program has a failure to add the second feature 142 due to unforeseen circumstances. In this case, it is desired to continue the configuration process so as to add as many of the permissible features as possible. Therefore, upon failing to add the second feature 142, the system configuration is restored with the checkpoint configuration saved at the end of adding the first feature 441, and then the configuration process skips over the addition of the second feature 142, the third feature 143, and the fourth feature 144 so that the next feature added is the fifth feature 145.

Figure 11:
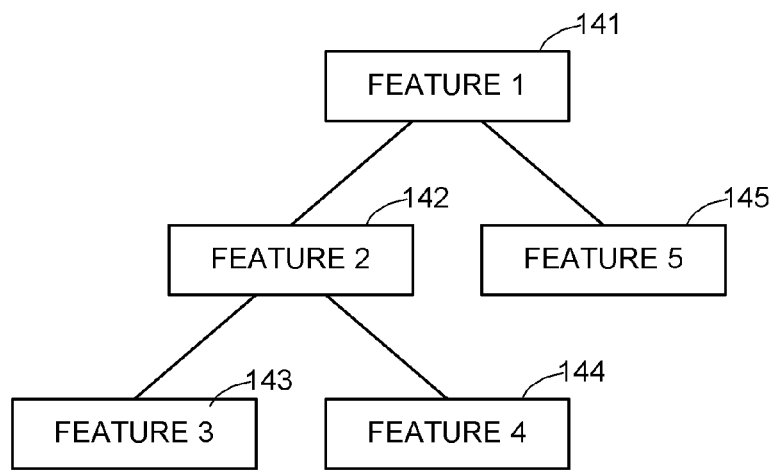
FIG. 11 is a hierarchy of the features shown in FIG. 10.

FIG. 11 illustrates that the dependencies of the features in FIG. 10 can be viewed or encoded by placing the features in a hierarchy or inverted tree data structure. Permissible system configurations are sub-trees that share the basic or root feature 141. If there is a failure to add a feature, then the branch of this feature is cut off from the tree of permissible configurations. In effect, the state machine scans the tree of permissible configurations when it scans the command file for opcodes to transfer to the command array. When the state machine fails to add a feature and the state machine decides that addition of this feature should not be re-tried, then the state machine skips the branch that becomes cut off from the tree, and continues to scan any remaining portion of the tree. Therefore, when there is a failure to add the second feature 142, the branch including the third feature 143 and the fourth feature 144 is cut off from the tree of permissible configurations, and the state machine continues to scan the remaining portion of the tree to add the fifth feature 145.

Figure 12:
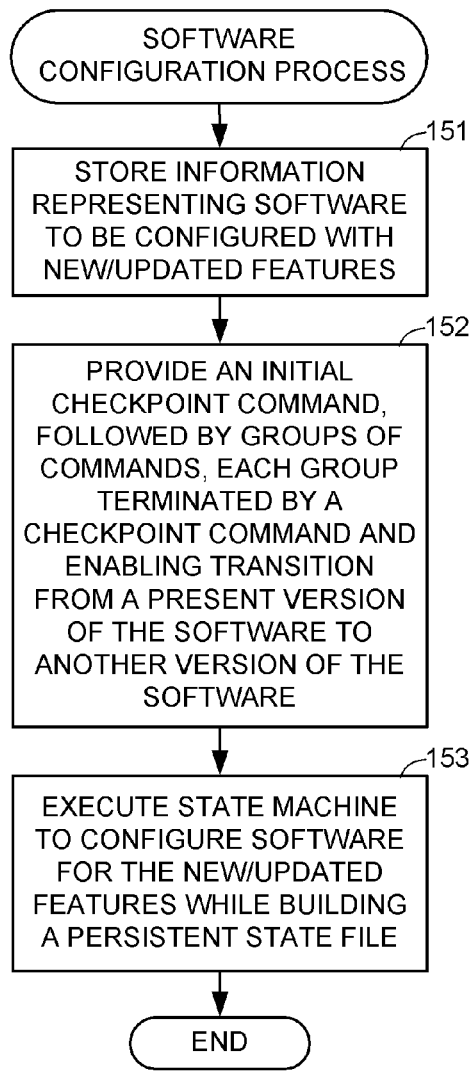
FIG. 12 is a top-level flowchart of the software configuration program.

FIG. 12 shows the basic software configuration process performed by the software configuration program (51 in FIG. 1). In a first step 151, information is stored representing the software to be added with the new or updated features. For example, this information is stored in the software information file (52 in FIG. 1). In step 152, an initial checkpoint command is provided, followed by opcodes, and each opcode is terminated by a checkpoint command and enables transition from a present state of software configuration to another state of the software configuration. For example, the commands are assembled in the command array (93 in FIG. 7), and the opcodes are obtained from the command file (53 in FIG. 1) in accordance with the particular versions of the features to be added as found in the software information file (52 in FIG. 1). Finally, in step 153, the state machine is executed to add the software for the new or updated features while building a persistent state file. For example, the state machine adds the software for the new or updated features by interpreting the commands in the command array.

Figure 13:
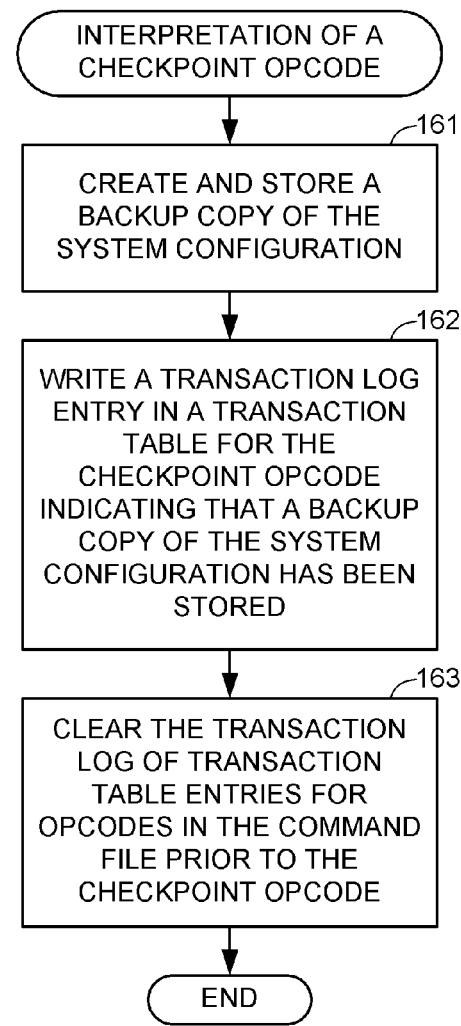
FIG. 13 is a flowchart of a procedure for interpretation of a checkpoint opcode.

FIG. 13 shows how the state machine interprets a checkpoint opcode. In a first step 161, the state machine (55 in FIG. 1) creates and stores a backup copy of the system configuration. For example, this is done by updating the system configuration database (48 in FIG. 1) and then storing a checkpoint copy of the system configuration database in the backup database (47 in FIG. 1). For additional protection, the backup database could be put on a server remote from the digital computer on which the software is being configured. Next, in step 162, the state machine writes a transaction log entry in a transaction table for the checkpoint entry. The entry in the transaction table indicates that a backup copy of the system configuration has been stored. For example, the entry in the transaction table includes a file name of the backup copy for the checkpoint in the backup database (47 in FIG. 1). Finally, in step 163, the state machine clears the transaction log of transaction table entries for opcodes in the command file prior to the checkpoint opcode.

Figure 14:
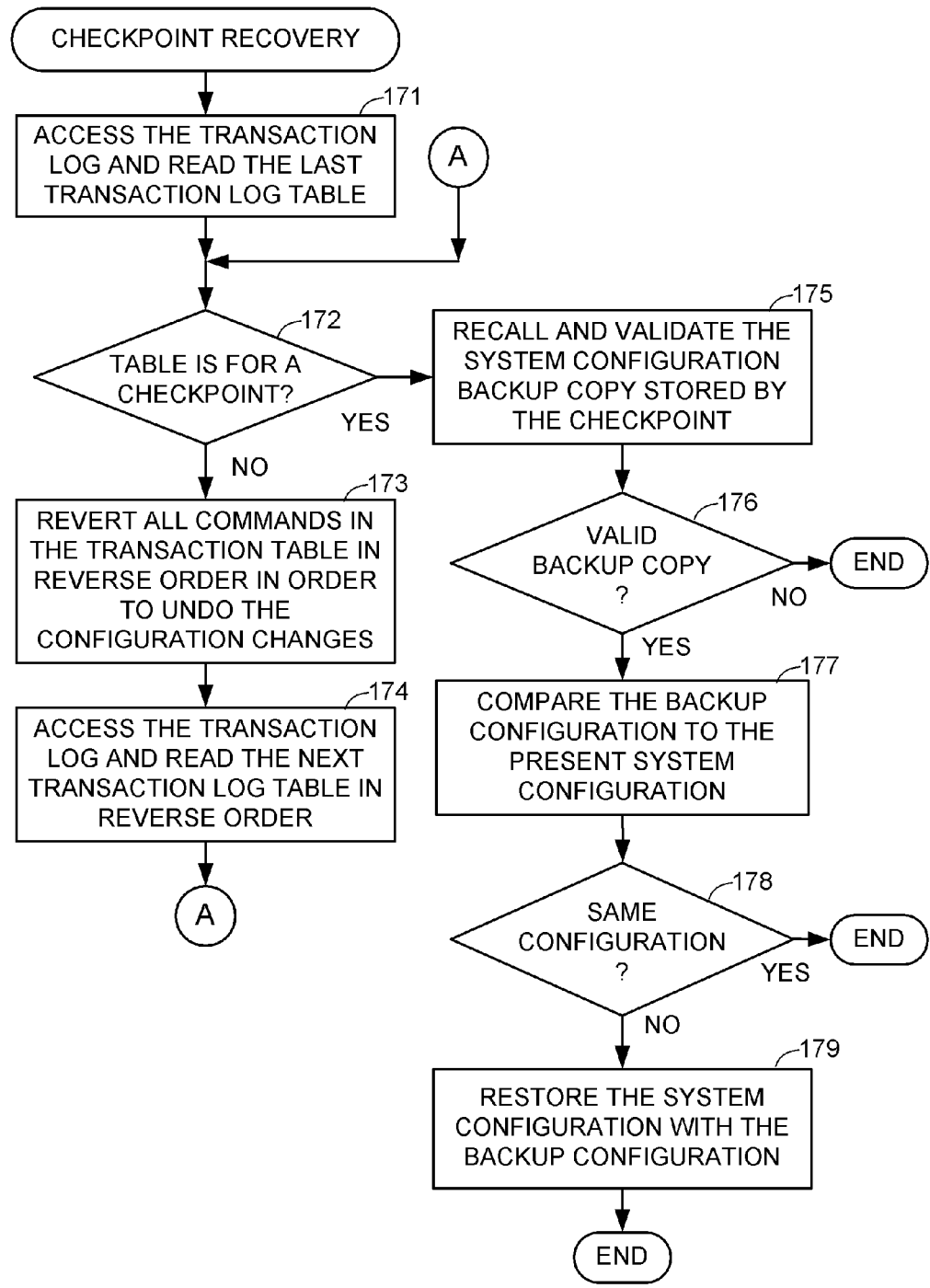
FIG. 14 is a flowchart of a checkpoint recovery procedure.

FIG. 14 shows the checkpoint recovery procedure of the state machine (55 in FIG. 1). In a first step 171, the state machine accesses the transaction log and reads the last transaction log table. In step 172, if the table is not for a checkpoint, then execution continues to step 173. In step 173, the state machine reverts all commands in the transaction table in reverse order to undo the configuration changes of the commands. The state machine reverts each command by undoing any and all changes caused by the execution of the command. In general, automatic recovery is enabled by using configuration commands that can be reverted automatically.

The reversion of a command may involve checking whether particular changes were in fact made by execution of a command, and then undoing the changes that were in fact made. The transaction table for a particular opcode may include an indication of changes that were in fact made by execution of the elementary commands for the opcode. In general, the reversion operation for each command should be devised with consideration of the possibility that execution of the command may have been interrupted, for example, due to a power failure, a hardware or software failure, or a processor reset.

Recovery from interruptions is simplified for configuration commands that are idempotent, and for reversions that are idempotent. A command or reversion is idempotent if the command or reversion can be executed any number of times and it will result in same result. In this case, an interrupted idempotent command can be re-executed to complete an interrupted command, or an interrupted command can be reverted by an idempotent reversion to undo any effect of the interrupted command, regardless of whether the interrupted command was completed before the recovery.

In step 174, the state machine accesses the transaction log and reads the next transaction log table in reverse order. Execution loops from step 174 back to step 172. Eventually, in step 172, the transaction table for a checkpoint will be reached. In this case, execution branches from step 172 to step 175. In step 175, the state machine recalls and validates the system configuration backup copy that was stored by the checkpoint. For example, the file name of the backup copy (in the backup database 47 in FIG. 1) is read from the transaction table for the checkpoint. In step 176, the backup copy is validated, for example by comparing information in a header of the backup copy to system metadata, and verifying a checksum at the end of the backup copy. If the backup copy cannot be validated, then the error should be reported and the recovery operation is stopped. Otherwise, if the backup copy is valid, then execution continues from step 176 to step 177.

In step 177, the state machine compares the backup configuration to the present system configuration. In step 178, if the backup configuration is the same as the present system configuration, then the checkpoint recovery is not necessary. Otherwise, if the backup configuration is different from the present system configuration, then execution continues to step 179. In step 179, the state machine restores the system configuration with the backup configuration, and the checkpoint recovery is finished.

Figure 15:
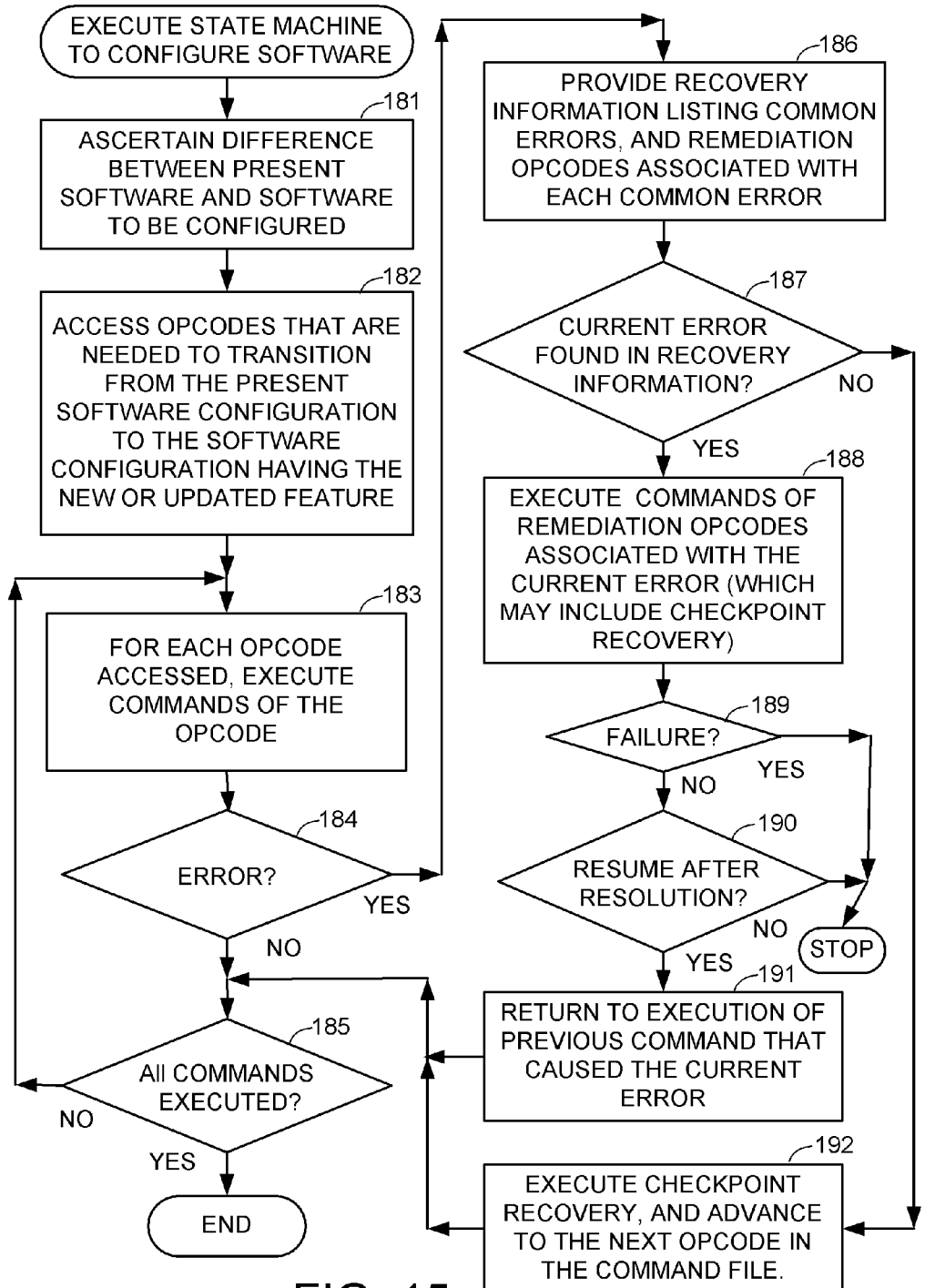
FIG. 15 is a flowchart of the state machine.

FIG. 15 shows the method used by the state machine (55 in FIG. 1) for configuring software using the storage information file (52 in FIG. 1), the command file (53 in FIG. 1), and the error information file (54 in FIG. 1). The following steps need not be performed in the order presented, as long as the files are instantiated before the state machine is executed. If the software is being installed for the first time, the state file (56 in FIG. 1) will be created. If the state machine is being invoked after a system reboot or recovery, or after facing an error during an installation or update or upgrade operation, then an already existing state file will be accessed.

In a first step 181, the state machine ascertains the difference between the present software configuration and the desired new software configuration (if present software exists). In step 182, the state machine then accesses opcodes in the command file that are needed to transition from the present software configuration to the desired new software configuration in order to add each new or updated feature. In step 183, for each opcode accessed, commands of the opcode are executed. For example, each opcode is interpreted as a sequence of one or more commands of the opcode, and then these commands are executed sequentially. In step 184, errors are monitored, and if no errors occur, execution continues to step 185. In step 185, if all commands of the opcode have been executed, then the configuration process of the opcode is finished. If opcodes remain, then execution loops from step 185 back to step 183. The process repeats from step 183 until all opcodes have executed (step 185) or an error is encountered in step 184.

If an error is encountered during the process, then execution branches from step 184 to step 186. In step 186, the error information file is consulted. The error information file may have been loaded along with the software configuration program, or it may be loaded after the error is encountered. The error information file (54 in FIG. 4) includes information listing common errors (82 in FIG. 4) and associated resolution files (83 in FIG. 4) containing remediation opcodes associated with each common error. In step 187, if the error is found in the error information file for the command executed in step 183, then execution continues to step 188 to execute commands of the remediation opcodes associated with the common error. If there is a failure during execution of the remediation opcodes, as tested in step 189, then execution stops for manual intervention. Otherwise, execution continues from step 189 to step 190.

The commands of the remediation opcodes may include a command to invoke the checkpoint recovery procedure of FIG. 14, and commands for continuing the configuration process upon completion of the checkpoint recovery procedure. For example, the commands of the remediation opcodes could include a command for invoking the checkpoint recovery procedure to access the persistent record of execution in the transaction log to identify executed commands of the opcode causing the error, and then undoing changes made to the software configuration by these executed commands of the opcode. Once the checkpoint recovery procedure has restored the configuration of the digital computer to the checkpoint configuration that existed at the beginning of execution of the opcode having caused the error, the commands of additional remediation opcodes would be executed for correcting the source of the error and then resuming the configuration process by retrying execution of the opcode having caused the error.

In step 190, the resume after resolution field (84 in FIG. 4) in the error information file (54 in FIG. 1) associated with the error is checked. If this field indicates that the command should be resumed, then in step 191 the process returns to executing the opcode from the step where the configuration process may be continued from the command in the command file that caused the failure (step 183). If the resume after resolution field indicates that execution is not to be resumed after execution, then the state machine procedure is stopped in expectation of manual intervention.

In step 187, if the current error is not found in the recovery information, then execution branches to step 192 to execute the checkpoint recovery procedure discussed above with reference to FIG. 14. If the checkpoint recovery procedure is successful, then execution may continue from step 192 to step 185 to continue the configuration process by advancing to the next opcode in the command file. If the current error in step 184 was an abnormal termination, then the configuration process may resume from the checkpoint to re-try execution of commands that were interrupted by the abnormal termination.

The use of the checkpoint recovery in steps 188 and 192 may avoid the need for manual intervention in many cases, or else provide a better starting point for manual recovery operations. For example, without the benefit of the checkpoint recovery in step 192, if the current error was not found in the recovery information in step 187, the configuration process would stop at this point, and manual intervention would be expected. Although the command resulting in the last error can be retried, if that error is persistent, it will yield the same result. This scenario can be problematic for a system update or upgrade process in which the system is left part way into the configuration process so that users could be denied service until the configuration process is completed. Typically, service personnel would come in and examine the faulted command, and manually fix the problem and resume the configuration process. In addition, the source code of the software configuration program could be re-written so that it could better handle such issues in the future.

Figure 16:
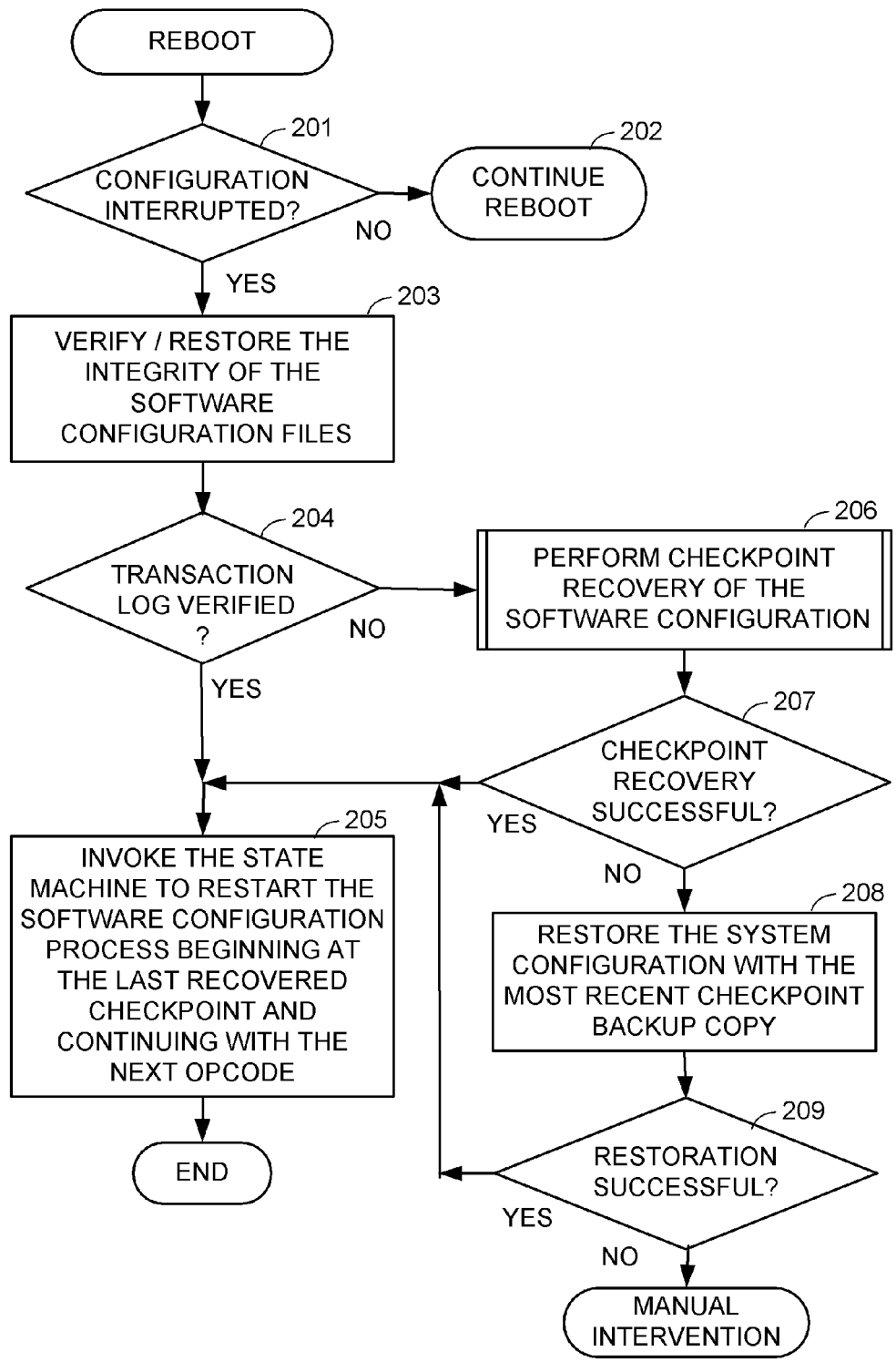
FIG. 16 is a flowchart of recovery during re-boot to resume an interrupted process of software configuration.

FIG. 16 shows an example of using the checkpoint recovery during computer boot up in the reboot process. In a first step 201, the operating system of the computer checks a log (such as the command transaction log 94 in FIG. 8) to determine if the software configuration process was interrupted. If not, then execution branches to step 202 to continue the reboot in the conventional fashion. If the software configuration process was interrupted, then execution continues from step 201 to step 203. In step 203, the integrity of the software configuration files is verified by using the checksum at the end of each software configuration file, and if a software configuration file has been corrupted, then the file is restored from an original or a backup copy. In step 204, if the command transaction log was verified to indicate that the configuration process was interrupted at a consistent software configuration state, then execution continues to step 205 to invoke the state machine to restart the software configuration process at the consistent software configuration state, by beginning at the last recovered checkpoint and continuing with execution of the next opcode. Otherwise, if the transaction log is not verified to indicate that the configuration process was interrupted at a consistent software configuration state, then execution branches to step 206 to perform the checkpoint recovery method as described above with reference to FIG. 14 in order to restore the system configuration to the configuration of the most recent checkpoint. After step 206, execution continues to step 207. In step 207, if the check point recovery of step 206 has been successful in restoring the system configuration to the configuration of the most recent checkpoint, then execution branches to step 205 in order to invoke the state machine to restart the software configuration process beginning at the last recovered checkpoint. Otherwise, if the checkpoint recovery of step 206 has not been successful, then execution continues from step 207 to step 208. In step 208, the system configuration is restored with the most recent checkpoint backup copy. In step 209, if the restoration in step 208 is successful, then execution branches to step 205 to in order to invoke the state machine to restart the software configuration process beginning at the last recovered checkpoint. Otherwise, if the restoration in step 208 has not been successful, for example because all of the backup copies have been corrupted, then the re-boot process is stopped for manual intervention.

The invention will now be described with respect to a specific embodiment wherein the features are related to volume partitioning for a storage application. In this specific embodiment, the software configuration program 51 of FIG. 1 is used to install or update or upgrade Linux Logical Volume Management (LVM) partitions in a storage system. The software configuration program 51 can perform automatic updates and other configuration changes to the logical volume partitions during normal operation of the storage system in a fashion transparent to a user of the storage system. For instance, such a configuration change operation may create, expand, delete, reconfigure, or resize an existing logical volume during normal operation of the storage system without requiring a shutdown and re-boot of the storage system. The software configuration program 51 provides fault tolerant and non-disruptive recovery if there is a failure of such a configuration change operation.

Figure 25:
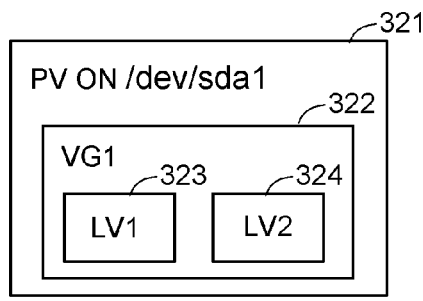
FIG. 25 is a block diagram of a logical volume configuration resulting from the execution of the sequence of commands in FIG. 23.

In general, logical volume management relates to storage management by partitioning of storage of a storage system into logical volumes. A logical volume can then be assigned to a particular client or a group of clients, or a file system shared among a group of clients can be built on a logical volume. The partitioning of storage of a storage system into logical volumes typically involves arranging the storage into physical volumes, configuring volume groups of the physical volumes, and then configuring logical volumes within the volume groups. A specific example is shown in FIG. 25, as further described below.

In general, a physical volume (PV) (321 in FIG. 25) consists of one or many partitions (or physical extent groups) on a physical drive. A volume group (VG) (322 in FIG. 25) is composed of one or more physical volumes, and contains one or more logical volumes (LV) (323 and 324 in FIG. 25). A logical volume is a unit of logical storage contained within a volume group.

Figure 17:
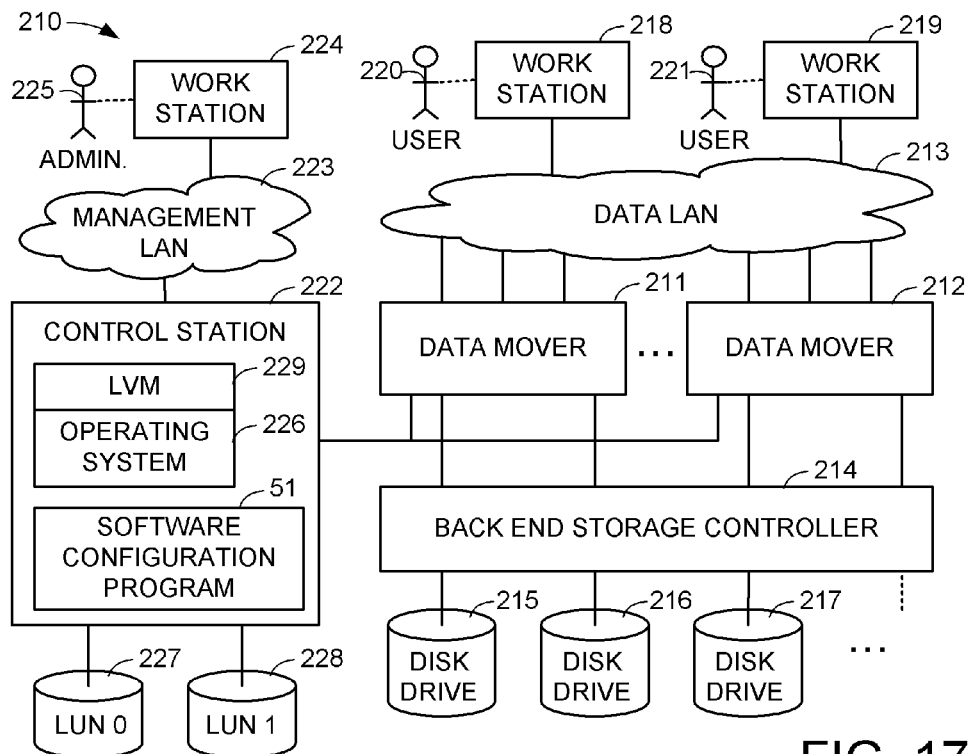
FIG. 17 is a block diagram of a file server including a control station computer and data mover computers.

An example of such a storage system in which the invention can be employed is the Celerra® product family from EMC Inc. of Hopkinton, Mass. The Celerra® product family covers a broad range of configurations and capabilities that scale across all ranges of networked storage, NAS, SAN, etc. The Celerra® product family consists of common building blocks. An example of one configuration of a Celerra® system 210 is shown in FIG. 17.

As shown, data mover computers 211, 212 move data back and forth between a data LAN 213 and a back-end storage controller 214 of an array of disk drives 215, 216, 217. The data LAN 213, for example, links client work stations 218, 219 of human users 220, 221 to the data movers 211, 212 for shared access to storage of the disk drives 215, 216, 217. A control station (CS) 222 provides a management station for the system 210. The storage system 210 is configured and controlled via the control station 222. The control station 222 is coupled to a management LAN 223, from which the control station software may be downloaded, for example from a work station 224 of an administrator 225. The management LAN 223 may be connected to the data LAN 213 and/or the Internet. Alternatively, the management entity may be a user terminal attached directly to the control station 222, or may be a terminal 224 attached via the management LAN 223, or may be an application operating via remote download, or via other known ways.

The software configuration program 51 is loaded and run on the control station (CS) 222, or other such storage system control units. The control station 222 is a general purpose digital computer similar to the digital computer 20 in FIG. 1. The control station 222 runs an operating system (OS) 226 and relies on internal Logical Units (LUNs), referred to as control LUNs 227 and 228, for storage of runtime database and configuration information. The control LUNs 227, 228 are shown in FIG. 17 as connected directly to the control station 222, but they could reside in the back-end disk drives 215, 216, 217 or anywhere else in the storage system 210. Originally, these control LUNs 227, 228 were physically partitioned into fixed size partitions. Over time, growing business demands required that physical partitions on the control LUNs 227, 228 be expanded. Thus subsequent releases of software for the control station required larger physical partitions or additional instances of control LUNs 227, 228. Static definition of physical partitions on the control LUNs thus met with a scalability issue.

A Linux Logical Volume Manager (LVM) 229 was then employed to replace the statically defined physical partitions on the control LUNS 227, 228. However, this presented a set of upgrade issues regarding how to deploy LVM partitions effectively for all storage platforms. First of all, different generations of hardware platforms have different control LUN layouts. Further, during updates or upgrades, platforms may need to be converted from physical partitions (that do not employ LVM partitions at all) to LVM partitions, or from smaller LVM partitions to larger ones, or from fewer LVM partitions to a larger number of partitions.

Storage system updates or upgrades must handle all platform types, as well as various permutations of software update or upgrade from-to versions pairing. For instance, a system that uses physical partitions rather than LVM partitions may need to be updated or upgraded to support LVM partitions. Or, a system that uses LVM partitions may need to be updated or upgraded to a different number of LVM partitions, or different sized LVM partitions. Thus it is necessary to support each software version that could potentially add, expand, change, decommission, or retire LVM partitions. However, it is inconvenient to provide a separate software configuration package for every possible LVM configuration update or upgrade combination. The software configuration program as introduced above is used to install or update or upgrade the LVM software 229 with regard to LVM partitioning. However, any system (storage or not) embodying LVM partitions can employ the software configuration program as introduced above.

Figure 18:
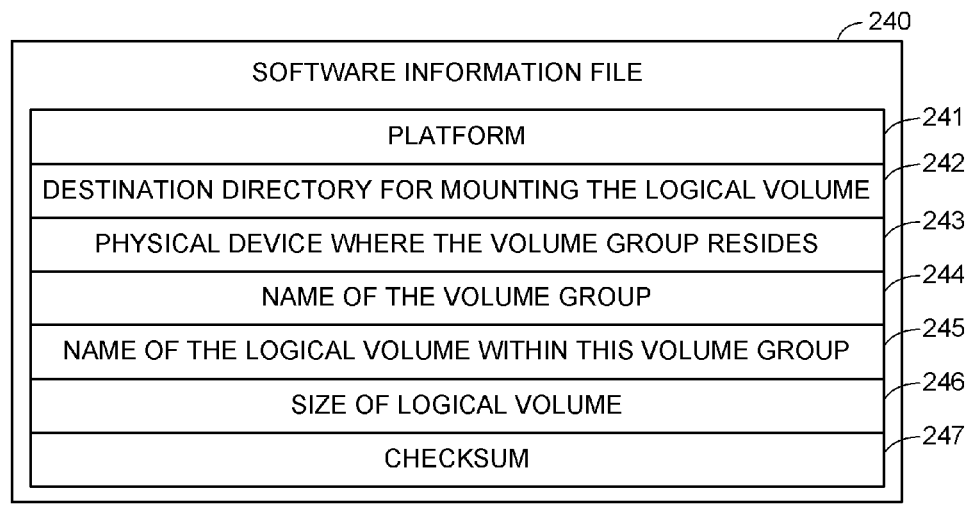
FIG. 18 is a block diagram of a software information file for logical volume management (LVM) software in the control station computer.

FIG. 18 shows a storage information file 240 for a desired new version of the LVM software (229 in FIG. 17). The storage information file 240 includes information representing the desired new version of software, including information about the features associated with the desired new version of software. In this case, the storage information file 240 includes information about LVM partitions. The storage information file 240 defines the final logical volume partition layout that represents the desired new version of software. The storage information file 240 is the database referred to while creating or modifying the logical volumes for the software being configured.

The storage information file 240 is in the form of a table, referred to as an LVM table 240. The LVM table 240 defines the final logical volume partition layout for a given version of the LVM software (229 in FIG. 17). This table 240 is an example of information that could be used by a storage system to define the logical volumes that are to be laid out or modified on the system. The table 240 includes the fields particular to the feature of logical volume management, including the platform 241, the destination directory 242 for mounting the logical volume, the physical device 243 where the volume group resides, the name 244 of the volume group, the name 245 of the logical volume within this volume group, and the size 246 of the logical volume. Also included is a checksum 247 that can be used by the state machine to verify the integrity of the table 240.

Following is an example of the information found in the storage information file 240:

. . . . NS|0|/home|$LVM_PRI_IDE|emc_vg_pri_ide|emc_lv_home|600M|SYS
 NS|0|/celerra/backup|$LVM_PRI_IDE|emc_vg_pri_ide|emc_lv_celerra_backup|840M|SYS
 NS|0|/nbsnas/jserver|$LVM_LUN_0|emc_vg_lun_0|emc_lv_nbsnas_jserver|1416M|NAS
 NS|0|/nas/jserver|$LVM_PRI_IDE|emc_vg_pri_ide|emc_lv_nas_jserver|1416M|NAS
 NS|0|/nas/var|$LVM_LUN_5|emc_vg_lun_5|emc_lv_nas_var|100M|NAS
 NS|0|/nas/var/dump|$LVM_LUN_0|emc_vg_lun_0|emc_lv_nas_var_dump|1692M|NAS
 NS|0|/nas/var/auditing|$LVM_LUN_0|emc_vg_lun_0|emc_lv_nas_var_auditing|120M|NAS
 NS|0|/nas/var/backup|$LVM_LUN_5|emc_vg_lun_5|emc_lv_nas_var_backup|840M|NAS
 NS|0|/nas/var/emcsupport|$LVM_LUN_5|emc_vg_lun_5|emc_lv_nas_var_emcsupport|560M|NAS
 NS|0|/nas/var/log|$LVM_LUN_5|emc_vg_lun_5|emc_lv_nas_var_log|212M|NAS
 NS|0|/celerra/backendmonitor|$LVM_PRI_IDE|emc_vg_pri_ide|emc_lv_celerra_backendmonitor|8M|SYS
 NS|0|/celerra/audit|$LVM_PRI_IDE|emc_vg_pri_ide|emc_lv_celerra_audit|120M|SYS
 NS|0|/celerra/commoncache|$LVM_PRI_IDE|emc_vg_pri_ide|emc_lv_celerra_commoncache|512M|NAS
 NS|0|/celerra/ccc|$LVM_PRI_IDE|emc_vg_pri_ide|emc_lv_celerra_ccc|560M|NAS
 . . . .

Figure 19:
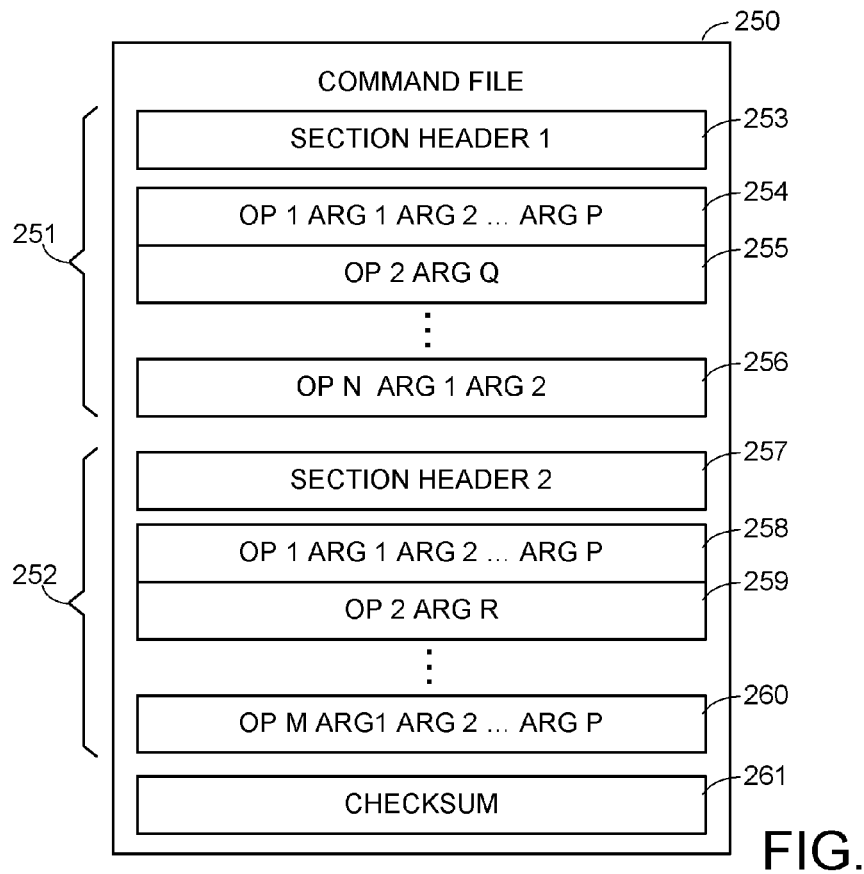
FIG. 19 is a block diagram of a command file for configuration of the LVM software.

FIG. 19 shows a command file 250 for configuring a desired new version of the LVM software (229 in FIG. 17). In order to support easily moving from one existing LVM layout to a new LVM layout (which is defined in the LVM table 240 of FIG. 18), the new command file 250 is divided into different sections 251, 252. Each of these sections 251, 252 has a section header and defines a set of commands to obtain the logical volume layout for every defined version of this software product.

As shown in FIG. 19, a first section 251 has a section header 253 and a set of commands 254, 255, 256. A second section 252 has a section header 257 and a set of commands 258, 259, 260. In each section, the section header includes information indicating whether the commands in the section should be executed. The state machine determines which sections should be executed by taking the section header information into consideration. The section header information can include information related to hardware platform, a version number related to the storage information table version numbers, software version numbers, or any combination of the like that identifies the system on which the operation is happening. In accordance with one embodiment, if the version number on the present system software is greater than the version identified in the section header, then that section will be skipped. In accordance with another embodiment, if the version number of the LVM partition feature is greater than the version identified in the section header, then that section will be skipped.

Commands may be of varying types as required by business needs. A given command may have several arguments, for example as shown in the first command 254. Or a command could have a single argument, as shown in the second command 255, or no arguments. In a particular embodiment, commands in the storage command file 250 come from a pre-defined pseudo LVM language or opcodes, which capture an LVM operation in a manner that is transparent from the underlying technology. Thus the underlying implementation of the LVM mechanism, which may be something like Linux software PAID, is rendered transparent and transportable.

There are basic LVM creation commands, destruction or removal commands, attribute change commands, and manipulation commands. In addition, the command file 250 may include commands for invoking LVM data capture tools and LVM display tools as further described below with reference to FIG. 22. These LVM data capture and display tools can be invoked at particular steps in the configuration process to verify and display configuration changes made and identify requested changes that were not made.

Following are examples of the basic LVM creation commands:

pvcreate—Used to create physical volumes.
vgcreate—Used to create volume groups.
lvcreate—Used to create logical volumes.

Following are examples of the basic LVM destruction or removal commands:

pvremove—Used to wipe the disk label of a physical drive so that LVM does not recognize it as a physical volume.
vgremove—Used to remove a volume group.
lvremove—Used to remove a logical volume.

Following are examples of the basic LVM attribute change commands:

pvchange—Used to change the attribute of a physical volume.
vgchange—Used to change the attribute of a volume group.
lvchange—Used to change the attribute of a logical volume.

Following are examples of the basic LVM manipulation commands:

vgextend—Used to add new physical volume (or partition(s) of same) to a volume group.
vgreduce—Used to remove physical volume (or partition(s) of same) from a volume group.
lvextend—Used to increase the size of a logical volume.
lvreduce—Used to decrease the size of a logical volume.

Following are some of the defined commands in this pseudo language when deploying Logical Volume Management partitions:

CVG [volume group—This command instantiates a volume group as described in the LVM table file 240 of FIG. 18. All of the information required to create this volume group is taken from the LVM table 240 for this volume. If the physical device that the volume group will reside on has not yet been initialized at the time that the volume group is created, it will be on the first invocation of this command.

CLV [logical volume]—This command instantiates a logical volume described in the LVM table 240 and mounts it on its designated mount point. All of the information required to create the logical volume is taken from the LVM table 240 entry for that logical volume. If the associated volume group does not exist at the time that this command is invoked, it will be created, and all preliminary steps to prepare the physical device for the volume group will be done at that time.

DVG [volume group]—This command deletes a volume group. If the volume group contains logical volumes, all steps required to safely delete the logical volumes will be taken first.

MOV [source directory] [target directory]—This command moves the contents of the source directory to the target directory.

CLD [device name]—This command initializes a block device for use as an LVM device, removing any partition tables that may be on the device first. This will completely destroy all data on the device and leave it in a state ready to be added to a volume group.

ELV [logical volume]—This command increase the size of the logical volume to the size indicated in the lvmtab. This command has no effect if the size specified is less than or equal to the current size.

RLV [volume group] [old logical volume] [new logical volume]—This command renames a logical volume.

CRF [volume group] [logical volume] [device name] [mount point] [size]—This command creates a logical volume in the specified volume group of the specified size and mounts it on the specified mount point. Any partitions or data on the specified block device will be cleared during this operation. This command is useful for creating temporary staging logical volumes that are not part of the final layout described in the LVM table 240.

IFVG [volume group]—This command provides a positive test of whether the given volume group exists. This command returns TRUE if it does and FALSE if it doesn't.

IFLV [volume group] [logical volume]—This command tests whether the given logical volume exists. This command returns TRUE if it exists and FALSE if it doesn't.

FIG. 20 shows fields 270 of a state file for configuring a desired new version of the LVM software (229 in FIG. 17). An index field 271 stores an index into the command array of the last successful command executed. The "To_LVMtable_checksum" field 272 stores the checksum of a new storage information file. The "To_LVMtable" field 273 stores the location of a new storage information file. The "From_LVMtable_checksum" field 274 stores the checksum of a previously existing LVM table file, if it exists. The "From_LVMtable" field 275 stores the location of a previously existing LVM table if it exists. A "Device_map_dir" field 276 stores a directory where a product-specific device map is located. A "storage command_file_checksum" field 277 stores a checksum of a storage command file. A "storage command_file" field 278 stores the location of the storage command file. A "mode" field 279 stores information identifying a configuration mode, such as an initial install, update, upgrade, or recovery mode. A "platform" field 280 identifies the storage system platform, and is the first of a number of product specific fields.

During configuration of the desired new version of the LVM software (229 in FIG. 17), the state machine first determines what the target (new) To_LVMtable file 240 is, and what the original (present) "From_LVMtable" is if there is one. And based on the configuration mode and "lvm version", the state machine then determines the appropriate command file. The state machine uses this information and the corresponding checksums to fill the fields 270 of the state file.

The state machine then determines the applicable sections within the command file (250 in FIG. 19) based on attributes of the present version of software and features and the desired new version of software and features, along with other product specific fields. Once the sections of the command file are identified, a command array is assembled.

Figure 21:
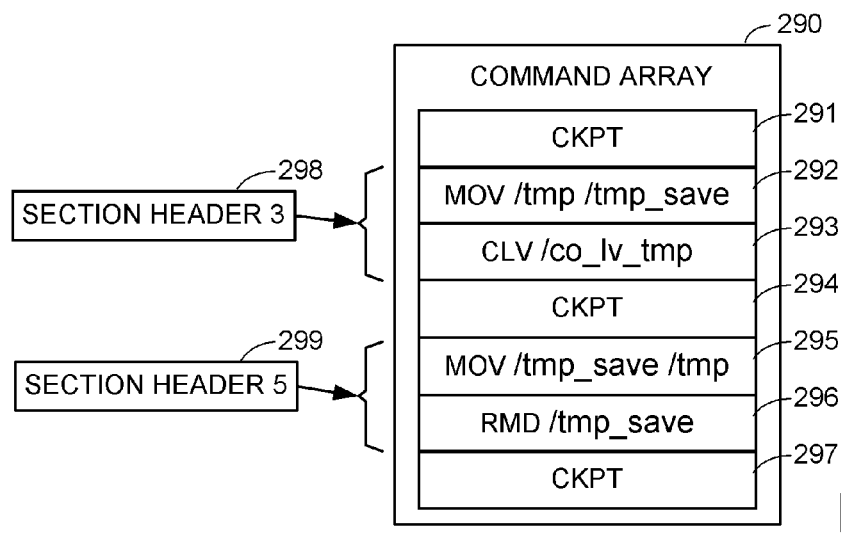
FIG. 21 is a block diagram of a command array during the configuration of the LVM software.

FIG. 21 shows an example of the command array 290 for configuring a desired new version of the LVM software (229 in FIG. 17). The command array begins with a first checkpoint (CKPT) opcode 291 followed by opcodes 292, 293 from a third section of the command file (250 in FIG. 19), followed by a second checkpoint (CKPT) opcode 294, and followed by opcodes 295, 296 from a fifth section of the command file, and followed by a third checkpoint (CKPT) opcode 297. In this case, section headers 298, 299 in the third and fifth sections of the command file indicate that the commands in these sections are associated with a newer LVM configuration than the LVM configuration of the present software. So, the commands from the third and fifth sections are gathered into the command array 290 interleaved with checkpoint opcodes.

As shown in FIG. 21, the commands associated with the header 298 of the third section include the MOV command 292 and CLV command 293. The commands associated with the header 299 of the fifth section include the MOV command 295 and the RMD command 296. Now that these commands are consolidated into the command array 290, they can be executed (as shown in FIG. 15 step 183) in order to perform the configuration change from the present software configuration to the desired new software configuration including the new LVM partitions.

The state machine employs the state file in order to keep persistent state during the configuration process. For example, the state machine can handle rebooting of a system (voluntarily or involuntarily), and continue the remaining process. This allows the operation to persist even while the process requiring a system reboot continues.

Upon initially recovering from a failure, the state machine will first verify the values in the fields (270 in FIG. 20) of the state file. If all fields are valid, including the checksums in the fields 272 and 274, the state machine can use the "Index" field 271 to skip any commands in the command array (290 in FIG. 21) which were already completed. This mechanism works well because the LVM configuration commands in the command file (250 in FIG. 19) are idempotent. That is, the same command can be executed any number of times and it will result in same result.

Figures 22, 23:
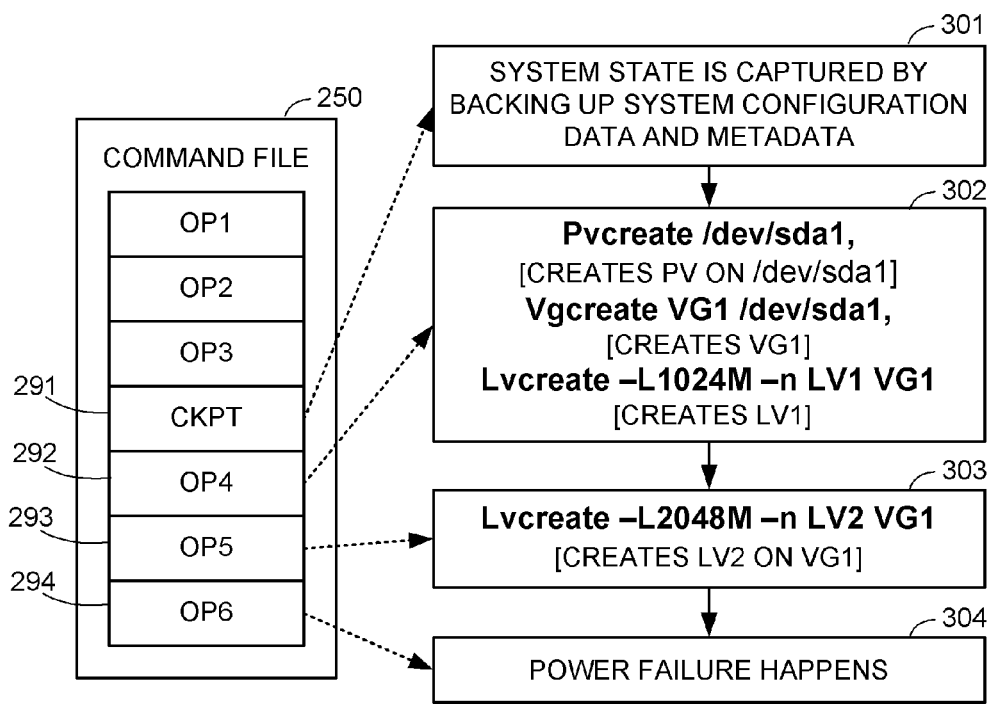
FIG. 22 is a table describing elements of metadata and data capture tools for the LVM software.
FIG. 23 is a block diagram showing execution of a sequence of commands from a command file during configuration of the LVM software.

FIG. 22 is a table describing elements of metadata and data capture tools for the LVM software (229 in FIG. 17) in the data storage system (210 in FIG. 17). A complication in this data storage system is that the system configuration information is distributed over the control station (222 in FIG. 17), the data mover computers (211, 212 in FIG. 17), and the back-end storage controller (214 in FIG. 17). Consequently, different data capture tools are used for different elements of metadata representing the LVM state in order to collect the system configuration information for creating and storing a copy of the system configuration during the interpretation of a checkpoint opcode (in step 161 of FIG. 13). Metadata is captured by performing a live scan of the system to obtain the elements associated or needed for restoring or comparing the LVM state of the data storage system. The metadata, which represents the LVM state on the data storage system, includes the physical and logical disk partition layout 291, the LVM physical volume (PV) layout 292, the LVM volume groups (VG) 293, LVM logical volumes (LV) 294, and File System mounts 295. The metadata has associated data, representing values of attributes of these elements of metadata.

As shown in FIG. 22, a "fdisk" tool is used for capturing data about the physical and logical disk partition layout 291. A "pvscan" tool scans the storage system for physical volumes and discovers the LVM physical volume (PV) layout 292. A "pvdisplay" display tool displays information about this physical volume layout. A "vgscan" tool scans the storage system for LVM logical volume groups (VG) 293. A "vgdisplay" tool displays information about these logical volume groups. A "lvscan" tool scans the storage system for LVM logical volumes (LV) 294. A "lvdisplay" tool displays information about these logical volumes. Finally, a "mount" tool is used for capturing data about file system mounts 295.

Following are specific examples of these elements of metadata and their associated data:

```
[root@nasdev209cs0 ~]# fdisk -l /dev/hda /dev/nda /dev/ndf
Disk /dev/hda: 250.0 GB, 250059350016 bytes
255 heads, 63 sectors/track, 30401 cylinders
Units = cylinders of 16065 * 512 = 8225280 bytes
Device Boot      Start         End      Blocks   Id  System /dev/hda1   *           1          16      128488+  83  Linux
/dev/hda2              17          69      425722+  83  Linux
/dev/hda3              70         330     2096482+  83  Linux
/dev/hda4             331       30401   241545307+   5  Extended
/dev/hda5             331         591     2096451   83  Linux
/dev/hda6             592         852     2096451   82  Linux swap
/dev/hda7             853       30401   237352311   8e  Linux LVM
Disk /dev/nda: 11.8 GB, 11811094528 bytes
255 heads, 63 sectors/track, 1435 cylinders
Units = cylinders of 16065 * 512 = 8225280 bytes
Device Boot      Start         End      Blocks   Id  System /dev/nda1   *           1          17      136521   6  FAT16
/dev/nda3             654        1435     6281415   8e  Linux LVM
Disk /dev/ndf: 68.7 GB, 68719411200 bytes
255 heads, 63 sectors/track, 8354 cylinders
Units = cylinders of 16065 * 512 = 8225280 bytes
Disk /dev/ndf doesn't contain a valid partition table
[root@nasdev209cs0 ~]# pvdisplay -c
/dev/ndf:emc_vg_lun_5:134209536:-1:8:8:-1:4096:16383:15955:
428:WVvn4P-UqFq-Oztt-3RCh-QYfG-3V3i-QbBnc8
/dev/hda7:emc_vg_pri_ide:474701824:-1:8:8:-
1:4096:57947:57091:856:ayU6Rj-3GYa-HLfG-l2Xw-Hnzv-LhhQ-
zE4Qhz
/dev/nda3:emc_vg_lun_0:12558336:-1:8:8:-1:4096:1533:726:807:
A9M87C-UTyG-2I46-b3CM-KgTN-Dfia-q9nTIu
[root@nasdev209cs0 ~]# vgdisplay -c
emc_vg_lun_5:r/w:772:-1:0:4:4:-
1:0:1:1:67104768:4096:16383:428:15955:xHuA3V-juRF-CgkI-
p1K6-LTWl-57CY-SUH4nv
emc_vg_pri_ide:r/w:772:-1:0:5:5:-
1:0:1:1:237350912:4096:57947:856:57091:5dgLmx-4OvA-VvRy-
LFAd-ySsS-L1Jn-FzaCg1
emc_vg_lun_0:r/w:772:-1:0:3:3:-1:0:1:1:6279168:4096:1533:807:
726:6xJ15o-ERNc-t8m3-owyd-ica5-vwK1-85V2F6
[root@nasdev209cs0 ~]# lvdisplay -c
/dev/emc_vg_lun_5/emc_lv_nas_var:emc_vg_lun_5:3:1:-1:1:
204800:25:-1:0:0:253:6
/dev/emc_vg_lun_5/emc_lv_nas_var_backup:emc_vg_lun_5:3:1:-
1:1:1720320:210:-1:0:0:253:9
/dev/emc_vg_lun_5/emc_lv_nas_var_log:emc_vg_lun_5:3:1:-1:1:
434176:53:-1:0:0:253:11
/dev/emc_vg_lun_5/emc_lv_nas_var_emcsupport:emc_vg_lun_5:
3:1:-1:1:1146880:140:-1:0:0:253:10
/dev/emc_vg_pri_ide/emc_lv_home:emc_vg_pri_ide:3:1:-1:1:
1228800:150:-1:0:0:253:0
/dev/emc_vg_pri_ide/emc_lv_nas_jserver:emc_vg_pri_ide:3:1:-
1:1:2899968:354:-1:0:0:253:1
/dev/emc_vg_pri_ide/emc_lv_celerra_backup:emc_vg_pri_ide:3:1:-
1:1:1720320:210:-1:0:0:253:2
/dev/emc_vg_pri_ide/emc_lv_celerra_backendmonitor:
emc_vg_pri_ide:3:1:-1:1:16384:2:-1:0:0:253:3
/dev/emc_vg_pri_ide/emc_lv_celerra_ccc:emc_vg_pri_ide:3:1:-
1:1:1146880:140:-1:0:0:253:4
/dev/emc_vg_lun_0/emc_lv_nas_var_dump:emc_vg_lun_0:3:1:-
1:1:3465216:423:-1:0:0:253:7
/dev/emc_vg_lun_0/emc_lv_nbsnas_jserver:emc_vg_lun_0:3:1:-
1:1:2899968:354:-1:0:0:253:5
/dev/emc_vg_lun_0/emc_lv_nas_var_auditing:emc_vg_lun_0:3:1:-
1:1:245760:30:-1:0:0:253:8
```

FIG. 23 shows execution of a sequence of commands from a command file 250 during configuration of the LVM software (229 in FIG. 17). The state machine interprets a checkpoint opcode (CKPT) 291, causing the LVM state to be captured by the data capture tools and backing up this system configuration data and metadata in step 301. The state machine then interprets an opcode 292, causing three elementary commands to be executed in step 302. Execution of the first elementary command "Pvcreate /dev/sda1" creates a physical volume (PV) on a disk drive named "/dev/sda1". Execution of the second elementary command "Vgcreate VG1 /dev/sda1" creates a first volume group (VG1). Execution of the third elementary command "Lvcreate −L1024M −n LV1 VG1" creates a first logical volume (LV1) on the first volume group (VG1).

The state machine interprets an opcode 293, causing one elementary command to be executed in step 303. This elementary command "Lvcreate −L2048M −n LV2 VG1" creates a second logical volume (LV2) on the first volume group (VG1). Finally, when the state machine begins interpreting an opcode 294, a power failure happens in step 304, which interrupts the configuration process.

Figure 24:
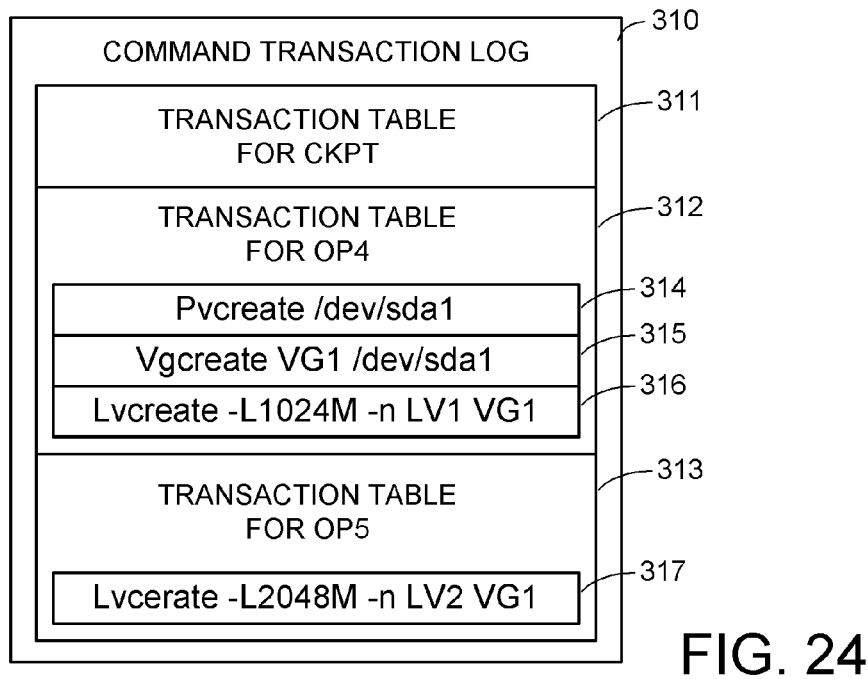
FIG. 24 is a block diagram of a command transaction log resulting from the execution of the sequence of commands in FIG. 23.

FIG. 24 shows the command transaction log 310 resulting from the execution of the sequence of commands in FIG. 23. At the time of the power failure and as found during a re-boot to recover from the power failure, the command transaction log 310 includes a transaction table 311 for the checkpoint opcode CKPT (291 in FIG. 23), followed by a transaction table 312 for the opcode OP4 (292 in FIG. 23), followed by a transaction table 313 for the opcode OP5 (293 in FIG. 23). The transaction table 312 for the opcode OP4 lists the three elementary commands "Pvcreate /dev/sda1" 314, "Vgcreate VG1/dev/sda1" 315, and "Lvcreate −L1024M −n LV1 VG1" 316. The transaction table 313 for the opcode OP5 lists the elementary command "Lvcreate −L2048M −n LV2 VG1" 317.

FIG. 25 shows a logical volume configuration resulting from the execution of the sequence of commands in FIG. 23. The logical volume configuration includes the physical volume (PV) 321 on the disk drive named "/dev/sda1". This physical volume 321 contains the volume group (VG1) 322. This volume group (VG1) contains the first logical volume (LV1) 323 and the second logical volume (LV2) 324. The logical volume configuration in FIG. 25 is the configuration at the start of a re-boot of the data storage system to recover from the power failure (304 in FIG. 23).

Figure 26:
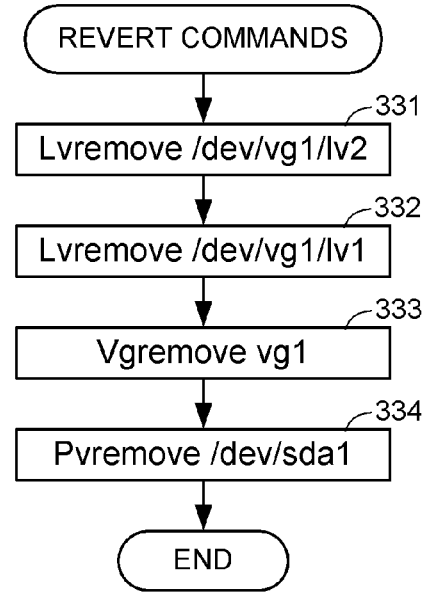
FIG. 26 shows a sequence of reversion commands to restore the volume configuration to a checkpoint state at the beginning of execution of the sequence of commands in FIG. 23.

FIG. 26 shows a sequence of revert commands to restore the volume configuration to a checkpoint state at the beginning of execution of the sequence of commands in FIG. 23. During the re-boot, as introduced above in FIG. 16, the state machine performs checkpoint recovery of the software configuration, as invoked in step 205 in FIG. 16, and as performed in FIG. 14. In step 171 of FIG. 14, the state machine accesses the transaction log 310 of FIG. 24 and reads the last transaction log table 313 at the end of the transaction log. In step 173 of FIG. 14, the state machine reverts all commands in this transaction log table 313 in reverse order. In this case, the transaction log table 313 includes the single command "Lvcreate −L2048M −n LV2 VG1" in the single entry 317. The state machine reverts this single command by converting this single command to the reversion command "Lvremove /dev/vg1/lv2" in step 331 of the reversion procedure in FIG. 26, and then executing this reversion command.

In step 174 of the checkpoint recovery of FIG. 14, the state machine again accesses the transaction log 310 of FIG. 24 and reads the next transaction table 312 in the reverse order. Execution loops from step 174 of FIG. 14 back to step 172 and then to step 173 because this next transaction table 312 is not for a checkpoint opcode. In step 173 of FIG. 14, the state machine reverts all commands in this transaction log table 313 in reverse order. The state machine first reverts the command "Lvcreate −L102M −n LV1 VG1" in the entry 316 of FIG. 24 by converting this command to the reversion command "Lvremove /dev/vg1/lv1" in step 332 of the reversion procedure in FIG. 26, and then executing this reversion command. Then the state machine reverts the command "Vgcreate VG1/dev/sda1" in the entry 315 of FIG. 24 by converting this command to the reversion command "Vgremove vg1" in step 333 of the reversion procedure in FIG. 26, and then executing this reversion command. Then the state machine reverts the command "PVcreate /dev/sda1" in the entry 314 of FIG. 24 by converting this command to the reversion command "Pvremove /dev/sda1" in step 334 of the reversion procedure in FIG. 26, and then executing this reversion command.

In step 174 of the checkpoint recovery of FIG. 14, the state machine again accesses the transaction log 310 of FIG. 24 and reads the next transaction table 311 in reverse order. Execution loops from step 174 of FIG. 14 back to step 172 where the reversion of the commands stops because the transaction table 311 is for a checkpoint opcode (CKPT). Execution then branches from step 172 to step 175 to recall and validate the system configuration backup copy stored by the checkpoint, and to continue from step 175 to step 176 and subsequent steps in FIG. 14. In short, if the reversion of the LVM commands in the transaction table 311 had reproduced valid backup configuration of the checkpoint, then the LVM configuration is restored to the backup configuration of the checkpoint.

As will be appreciated by one skilled in the art, aspects of the present invention may be embodied in a system, method or computer program product. Accordingly, aspects of the present invention may take the form of an entirely hardware embodiment, an entirely software embodiment (including firmware, resident software, micro-code, etc.) or an embodiment combining software and hardware. Furthermore, aspects of the present invention may take the form of a computer program product embodied in one or more computer readable medium(s) having computer readable program code embodied thereon. Any combination of one or more computer readable medium(s) may be utilized. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the above, there has been described a way of configuring software in a digital computer by executing selected opcodes to add corresponding new versions of features. When executing each opcode, a persistent record is kept of execution of each elementary command of the opcode. To recover from a failure of execution of a command of an opcode, the persistent record of execution is accessed to identify executed commands of the opcode, and the executed commands are reverted in reverse of their order of execution by undoing changes made to the software configuration by the execution of the executed commands of the opcode. The resulting configuration of the digital computer is compared to a backup copy of the configuration existing at the start of execution of the commands of the opcode. If the reversion of the executed commands of the opcode has not reproduced the backup configuration, then the configuration of the digital computer is restored to the backup configuration.

In any case, the software configuration process may then continue automatically by skipping over the opcodes to execute additional opcodes to add new features that are not dependent on the feature that was not added due to the error. In some cases, there will be recovery information associated with the failure of execution of a command of an opcode, and the recovery information will include remediation opcodes that can be executed to add the new version of the feature upon recovering from the error. Therefore, if an error occurs, the software configuration process may recover and continue to add automatically selected new versions of features. This may result in a computer configuration suitable for normal use by clients while the cause of the error is diagnosed and manual intervention is scheduled for adding any desired features that were not added automatically due to the error. In short, the software configuration process and error recovery method may avoid the need for manual intervention in many cases, or else provide a better starting point for manual recovery operations.

What is claimed is:

1. A method of configuring software in a digital computer, said method comprising a data processor of the digital computer executing computer instructions stored on a non-transitory computer readable storage medium to perform the steps of:
   (a) accessing opcodes in a software configuration program, each opcode enabling transition of a software configuration in the digital computer from a present state of the software configuration to another state of the software configuration having a new version of a feature, and each opcode having one or more commands;
   (b) executing the opcodes to add multiple features to the software configuration, and when executing each opcode, keeping a persistent record of execution of each command of said each opcode; and
   (c) in response to a failure of execution of a command of one of the opcodes, recovering from the failure by accessing the persistent record of execution to identify executed commands of said one of the opcodes, and by undoing changes made to the software configuration by the execution of the executed commands of said one of the opcodes; and
   which further includes the data processor of the digital computer executing the computer instructions stored in the non-transitory computer readable storage medium to perform the steps of:
   collecting and storing a persistent copy of configuration information of the digital computer existing at the start of execution of said one of the opcodes, and after undoing changes made to the software configuration by the execution of the executed commands of said one of the opcodes, comparing present configuration information of the digital computer to configuration information in the persistent copy of the configuration information of the digital computer to determine whether the present configuration information of the digital computer is the same as the configuration information in the persistent copy of the configuration information of the digital computer, and upon finding that the present configuration information of the digital computer is not the same as the configuration information in the persistent copy of the configuration information of the digital computer, restoring the digital computer to a configuration specified by the configuration information in the persistent copy of the configuration information of the digital computer.

2. A method of configuring software in a digital computer, said method comprising a data processor of the digital computer executing computer instructions stored on a non-transitory computer readable storage medium to perform the steps of:
   (a) accessing opcodes in a software configuration program, each opcode enabling transition of a software configuration in the digital computer from a present state of the software configuration to another state of the software configuration having a new version of a feature, and each opcode having one or more commands;

(b) executing the opcodes to add multiple features to the software configuration, and when executing each opcode, keeping a persistent record of execution of each command of said each opcode; and (c) in response to a failure of execution of a command of one of the opcodes, recovering from the failure by accessing the persistent record of execution to identify executed commands of said one of the opcodes, and by undoing changes made to the software configuration by the execution of the executed commands of said one of the opcodes; and which further includes undoing the changes made to the software configuration by the execution of the executed commands of said one of the opcodes by converting the executed commands of said one of the opcodes into reversion commands, and executing the reversion commands in reverse of an order of execution of the executed commands of said one of the opcodes.

3. A method of configuring software in a digital computer, said method comprising a data processor of the digital computer executing computer instructions stored on a non-transitory computer readable storage medium to perform the steps of:

(a) accessing opcodes in a software configuration program, each opcode enabling transition of a software configuration in the digital computer from a present state of the software configuration to another state of the software configuration having a new version of a feature, and each opcode having one or more commands;

(b) executing the opcodes to add multiple features to the software configuration, and when executing each opcode, keeping a persistent record of execution of each command of said each opcode; and (c) in response to a failure of execution of a command of one of the opcodes, recovering from the failure by accessing the persistent record of execution to identify executed commands of said one of the opcodes, and by undoing changes made to the software configuration by the execution of the executed commands of said one of the opcodes; and wherein the opcodes in the software configuration program have pseudo-commands translatable to elementary commands in a programming language, and the step (b) includes, at the beginning of execution of each pseudo-command, writing in a persistent transaction log a log table for said each pseudo-command, and at the beginning of execution of each elementary command translated from said each pseudo-command, writing an entry for said each elementary command in the log table for said each pseudo-command, and the step (c) includes scanning the transaction log in reverse order to identify the executed commands of said one of the opcodes, and to undo the changes made to the software configuration by the execution of the executed commands of said one of the opcodes.

4. A computer program product comprising non-transitory computer readable storage medium storing computer instructions and data structures, wherein the computer instructions and data structures include:

software information representing a version of software to be configured in a digital computer, a plurality of opcodes, and each opcode, when executed by a data processor of the digital computer, performing a transition from a present state of a software configuration in the digital computer to another state of the software configuration having a new version of a feature; and a state machine program that, when executed by the data processor, accesses the software information to select one or more of the opcodes, and executes commands of the selected opcodes to add new versions of features to the software configuration, and keeps a persistent record of execution of each of the executed commands; and in response to a failure of execution of a command of one of the selected opcodes, recovers from the failure by accessing the persistent record of execution to identify executed commands of said one of the selected opcodes, and by undoing changes made to the software configuration by the execution of the executed commands of said one of the selected opcodes;

wherein the state machine program, when executed by the data processor, further recovers from the failure by skipping further execution of said one of the selected opcodes, and executing subsequent opcodes in order to continue adding new versions of features of the software; and wherein the state machine program, when executed by the data processor, collects and stores a persistent copy of configuration information of the digital computer existing at the start of execution of said one of the selected opcodes, and after the undoing of changes made to the software configuration by the execution of the executed commands of said one of the selected opcodes, compares present configuration information of the digital computer to configuration information in the persistent copy of the configuration information of the digital computer to determine whether the present configuration information of the digital computer is the same as the configuration information in the persistent copy of the configuration information of the digital computer, and upon finding that the present configuration information of the digital computer is not the same as the configuration information in the persistent copy of the configuration information of the digital computer, restoring the digital computer to a configuration specified by the configuration information in the persistent copy of the configuration information of the digital computer.

5. A computer program product comprising non-transitory computer readable storage medium storing computer instructions and data structures, wherein the computer instructions and data structures include:

software information representing a version of software to be configured in a digital computer, a plurality of opcodes, and each opcode, when executed by a data processor of the digital computer, performing a transition from a present state of a software configuration in the digital computer to another state of the software configuration having a new version of a feature; and a state machine program that, when executed by the data processor, accesses the software information to select one or more of the opcodes, and executes commands of the selected opcodes to add new versions of features to the software configuration, and keeps a persistent record of execution of each of the executed commands; and in response to a failure of execution of a command of one of the selected opcodes, recovers from the failure by accessing the persistent record of execution to identify executed commands of said one of the selected opcodes, and by undoing changes made to the software configuration by the execution of the executed commands of said one of the selected opcodes;

wherein the state machine program, when executed by the data processor, further recovers from the failure by skipping further execution of said one of the selected opcodes, and executing subsequent opcodes in order to continue adding new versions of features of the software; and wherein the state machine program, when executed by the data processor, performs the undoing of changes made to the software configuration by the execution of the executed commands of said one of the selected opcodes by converting the executed commands of said one of the selected opcodes into reversion commands, and executing the reversion commands in reverse of an order of execution of the executed commands of said one of the selected opcodes.

6. A computer program product comprising non-transitory computer readable storage medium storing computer instructions and data structures, wherein the computer instructions and data structures include:

software information representing a version of software to be configured in a digital computer, a plurality of opcodes, and each opcode, when executed by a data processor of the digital computer, performing a transition from a present state of a software configuration in the digital computer to another state of the software configuration having a new version of a feature; and a state machine program that, when executed by the data processor, accesses the software information to select one or more of the opcodes, and executes commands of the selected opcodes to add new versions of features to the software configuration, and keeps a persistent record of execution of each of the executed commands; and in response to a failure of execution of a command of one of the selected opcodes, recovers from the failure by accessing the persistent record of execution to identify executed commands of said one of the selected opcodes, and by undoing changes made to the software configuration by the execution of the executed commands of said one of the selected opcodes;

wherein the state machine program, when executed by the data processor, further recovers from the failure by skipping further execution of said one of the selected opcodes, and executing subsequent opcodes in order to continue adding new versions of features of the software; and wherein the commands of the selected opcodes include pseudo-commands translatable to elementary commands in a programming language, and the state machine program, when executed by the data processor, writes in a persistent transaction log a log table for said each pseudo-command at the beginning of execution of said each pseudo-command, and at the beginning of execution of each elementary command translated from said each pseudo-command, writes an entry for said each elementary command in the log table for said each pseudo-command, and scans the transaction log in reverse order to identify the executed commands of said one of the selected opcodes, and to undo the changes made to the software configuration by the execution of the executed commands of said one of the selected opcodes.

7. A method of configuring software in a digital computer of a data storage system where multiple versions of the software are available, said method comprising:

(a) loading a software configuration program into the data storage system, the software configuration program including computer instructions and data structures, wherein the computer instructions and data structures include software information representing a version of the software to be configured in the digital computer, a plurality of opcodes, and each opcode, when executed by a data processor of the digital computer, performing a transition from a present state of a software configuration in the digital computer to another state of the software configuration having a new version of a feature; and a state machine program; and (b) executing the state machine program with the data processor of the digital computer to perform the steps of:

(1) accessing the software information to select one or more of the opcodes;

(2) executing the selected opcodes to add multiple features to the software configuration, and when executing each selected opcode, keeping a persistent record of execution of commands of said each selected opcode; and (3) in response to a failure of execution of a command of one of the selected opcodes, recovering from the failure by accessing the persistent record of execution to identify executed commands of said one of the selected opcodes, and undoing changes made to the software configuration by the execution of the executed commands of said one of the selected opcodes;

wherein the execution of the state machine program partitions storage of the storage system into logical volumes for storage management; and which further comprises the data processor of the digital computer executing the state machine program to perform the step of:

(4) after performing the step (3), skipping further execution of said one of the selected opcodes and executing subsequent opcodes in the software configuration program in order to continue adding new versions of features of the software; and which further includes the data processor of the digital computer executing the state machine program to perform the steps of:

collecting and storing a persistent copy of configuration information of the data storage system existing at the start of execution of said one of the selected opcodes, and after undoing changes made to the software configuration by the execution of the executed commands of said one of the selected opcodes, comparing present configuration information of the data storage system to configuration information in the persistent copy of the configuration information of the data storage system to determine whether the present configuration information of the data storage system is the same as the configuration information in the persistent copy of the configuration information of the data storage system, and upon finding that the present configuration information of the data storage system is not the same as the configuration information in the persistent copy of the configuration information of the data storage system, restoring the data storage system to a configuration specified by the configuration information in the persistent copy of the configuration information of the data storage system.

8. A method of configuring software in a digital computer of a data storage system where multiple versions of the software are available, said method comprising:

(a) loading a software configuration program into the data storage system, the software configuration program including computer instructions and data structures, wherein the computer instructions and data structures include software information representing a version of the software to be configured in the digital computer, a plurality of opcodes, and each opcode, when executed by a data processor of the digital computer, performing a transition from a present state of a software configuration in the digital computer to another state of the software configuration having a new version of a feature; and a state machine program; and (b) executing the state machine program with the data processor of the digital computer to perform the steps of:

(1) accessing the software information to select one or more of the opcodes;

(2) executing the selected opcodes to add multiple features to the software configuration, and when executing each selected opcode, keeping a persistent record of execution of commands of said each selected opcode; and (3) in response to a failure of execution of a command of one of the selected opcodes, recovering from the failure by accessing the persistent record of execution to identify executed commands of said one of the selected opcodes, and undoing changes made to the software configuration by the execution of the executed commands of said one of the selected opcodes;

wherein the execution of the state machine program partitions storage of the storage system into logical volumes for storage management; and which further comprises the data processor of the digital computer executing the state machine program to perform the step of:

(4) after performing the step (3), skipping further execution of said one of the selected opcodes and executing subsequent opcodes in the software configuration program in order to continue adding new versions of features of the software; and wherein the commands in the software configuration program include pseudo-commands translatable to elementary commands in a programming language, and the step (b) includes, at the beginning of execution of each pseudo-command, writing in a persistent transaction log a log table for said each pseudo-command, and at the beginning of execution of each elementary command translated from said each pseudo-command, writing an entry for said each elementary command in the log table for said each pseudo-command, and recovering from the failure by scanning the transaction log in reverse order to identify the executed commands of said one of the selected opcodes, and to undo the changes made to the software configuration by the execution of the executed commands of said one of the selected opcodes by converting the executed commands of said one of the selected opcodes into reversion commands, and executing the reversion commands in reverse of an order of execution of the executed commands of said one of the selected opcodes.

* * * * *